(12) United States Patent
Aubuchon

(10) Patent No.: US 6,900,922 B2
(45) Date of Patent: May 31, 2005

(54) MULTI-TILT MICROMIRROR SYSTEMS WITH CONCEALED HINGE STRUCTURES

(75) Inventor: Christopher M. Aubuchon, Palo Alto, CA (US)

(73) Assignee: Exajoule, LLC, Palo Alto, CA (US)

( * ) Notice: Subject to any disclaimer, the term of this patent is extended or adjusted under 35 U.S.C. 154(b) by 0 days.

(21) Appl. No.: 10/374,418

(22) Filed: Feb. 24, 2003

(65) Prior Publication Data

US 2004/0165250 A1 Aug. 26, 2004

(51) Int. Cl.[7] .............................................. G02B 26/00
(52) U.S. Cl. ...................... 359/292; 359/391; 359/290
(58) Field of Search ................................ 359/292, 291, 359/290, 295, 223, 224, 213, 214, 846; 73/504.07, 504.12; 310/16, 36, 90

(56) References Cited

U.S. PATENT DOCUMENTS

| | | | |
|---|---|---|---|
| 5,083,857 A | | 1/1992 | Hornbeck |
| 5,096,279 A | | 3/1992 | Hornbeck |
| 5,203,208 A | | 4/1993 | Bernstein |
| 5,212,582 A | | 5/1993 | Nelson |
| 5,535,047 A | * | 7/1996 | Hornbeck .................... 359/295 |
| 5,583,688 A | * | 12/1996 | Hornbeck .................... 359/291 |
| 5,600,383 A | | 2/1997 | Hornbeck |
| 5,777,719 A | | 7/1998 | Williams et al. |
| 5,835,256 A | | 11/1998 | Huibers |
| 5,991,066 A | | 11/1999 | Robinson et al. |
| 6,028,689 A | | 2/2000 | Michalicek et al. |
| 6,028,690 A | * | 2/2000 | Carter et al. ................. 359/224 |
| 6,198,180 B1 | | 3/2001 | Garcia |
| 6,232,936 B1 | | 5/2001 | Gove et al. |
| 6,323,982 B1 | | 11/2001 | Hornbeck |
| 6,329,738 B1 | | 12/2001 | Hung et al. |
| 6,337,760 B1 | | 1/2002 | Huibers et al. |
| 6,338,559 B1 | | 1/2002 | Williams et al. |
| 6,348,907 B1 | | 2/2002 | Wood |
| 6,351,330 B2 | | 2/2002 | Ko |
| 6,356,378 B1 | | 3/2002 | Huibers |
| 6,360,036 B1 | | 3/2002 | Couillard |
| 6,369,931 B1 | | 4/2002 | Funk et al. |
| 6,385,364 B1 | | 5/2002 | Abushagur |
| 6,388,661 B1 | | 5/2002 | Richards |
| 6,389,190 B2 | | 5/2002 | Solgaard et al. |
| 6,392,221 B1 | | 5/2002 | Aksyuk et al. |
| 6,396,619 B1 | | 5/2002 | Huibers et al. |
| 6,396,975 B1 | | 5/2002 | Wood et al. |
| 6,404,943 B1 | | 6/2002 | Wang |
| 6,407,851 B1 | | 6/2002 | Islam et al. |
| 6,411,751 B1 | | 6/2002 | Giles et al. |
| 6,411,754 B1 | | 6/2002 | Akkaraju et al. |
| 6,414,803 B1 | | 7/2002 | Pan et al. |
| 6,418,247 B1 | | 7/2002 | Presley |
| 6,487,001 B2 | | 11/2002 | Greywall |
| 6,522,454 B2 | * | 2/2003 | Meier et al. ................. 359/291 |
| 6,535,047 B2 | | 3/2003 | Mughal et al. |
| 6,552,840 B2 | * | 4/2003 | Knipe .......................... 359/291 |
| 6,614,576 B2 | * | 9/2003 | Strumpell et al. ........... 359/248 |
| 2002/0093721 A1 | | 7/2002 | Knipe |
| 2003/0002019 A1 | * | 1/2003 | Miller .......................... 353/119 |
| 2003/0117686 A1 | | 6/2003 | DiCarlo |

\* cited by examiner

Primary Examiner—Ricky Mack
Assistant Examiner—Brandi Thomas
(74) Attorney, Agent, or Firm—Frank P. Becking

(57) ABSTRACT

Multi-tilt mirrors, assemblies and applications of the same, and methods of making. Micromirror devices employing a superstructure that includes a mirror supported over a hinge set above substructure. Various features described are applicable to improve manufacturability, enable further miniaturization of the elements and/or to increase relative light return. Devices can be produced utilizing the various optional features described herein to provide miniaturized, highly controllable optics solutions.

19 Claims, 16 Drawing Sheets

MULTI-TILT MICROMIRROR SYSTEMS WITH CONCEALED HINGE STRUCTURES

FIELD OF THE INVENTION

The present invention relates generally to the field of spatial light modulators that can modify or correct an optical wavefront. More particularly, the invention relates to micro electro-mechanical systems (MEMS) in the form of micromirror devices used in adaptive optics, optical switching applications, or other light manipulation applications such as displays.

BACKGROUND OF THE INVENTION

MEMS devices are small structures, typically fabricated on a semiconductor wafer using processing techniques including optical lithography, metal sputtering or chemical vapor deposition, and plasma etching or other etching techniques that have been developed for the fabrication of integrated circuits. Micromirror devices are a type of MEMS device. Other types of MEMS devices include accelerometers, pressure and flow sensors, fuel injectors, inkjet ports, and gears and motors, to name a few. Micromirror devices have already met with a great amount of commercial success.

MEMS micromirror devices are being used in a variety of applications, including optical display systems, optical cross-connects for switching of optical data signals and adaptive optics for phase and other types of correction. One type of display device that has been used with a great deal of success is the Texas Instruments DLP™. In this system, many mirrors are operated individually in a bistable, digital fashion to create a projected display. Although current commercial technology has been limited to about 1.3 million pixels in the mirror array, greater mirror densities and higher yields should improve this in the future as the technology progresses.

Arrays of multi-axis tilting mirrors can also be found in other applications, such as, printing, scanning, projection, among many. Most current arrays of micromirrors can be separated into two categories: relatively large single mirrors that direct a single beam, or arrays of smaller mirrors, where many mirrors aim each light beam.

Larger mirrors can offer some advantages when steering a smaller number of discrete light beams in terms of providing an unbroken, nominally flat surface with high reflectivity. However, if the beams are too large for the mirrors, or if they are misaligned, the reflected beam is clipped and has less intensity. These types of arrays are less suitable for reflecting larger, continuous light such as an optical image. Generally, the support structures between actuating mirror elements leave too much space and thus create noticeable holes in the reflected image. Arrays of smaller mirrors also have drawbacks. Many current designs may only move in one axis, which limits some of their potential applications. Others that can move in a multi-axis fashion also often have relatively large gaps from one mirror to the next that affect the quality of the reflected beam or image. Micromirrors set in an array such as this must have some gaps between them to allow fill movement of each mirror, but it is advantageous to decrease the size of the gaps as much as possible. In addition, many designs have support structures that are small, yet are part of the visible surface. These can also contribute to the spacing between mirrors. Supports and hinges that are hidden behind the mirror surface would improve the overall reflective surface area.

A particularly important application for multi-axis tilting micromirrors is in the field of optical switching. A typical optical cross-connect for an optical networking switch includes a switching matrix having two arrays or clusters of MEMS micromirrors. The first array of micromirrors is arranged so that micromirrors in the first array receive optical input signals from one or more input sources, such as optical fiber input(s) and the second array of micromirrors is arranged so that micromirrors in the second array receive optical signals reflected from micromirrors in the first array and direct the signals as optical output signals to one or more optical outputs.

The micromirrors in each array are capable of being adjusted, steered or tilted, so that a micromirror in the first array is capable of directing a reflected optical signal to a micromirror in the second array selected from a plurality of the micromirrors in the second array. Similarly, the micromirrors in the second array can be adjusted, steered or tilted so as to align with a micromirror in the first array selected from a plurality of the micromirrors in the first array. Thus, by appropriate orientation of the micromirrors by adjustment, steering or tilting, a first micromirror in the first array can be set to deliver an optical signal to a first, second, or third, etc. micromirror of the second array, as desired, and so forth, thereby providing the switching capability of the cross-connect.

The performance of optical cross-connects that use such arrangements of MEMS micromirrors depends upon a number of factors, including how well the micromirrors in the first array are optically aligned with the micromirrors in the second array, changes in temperature, voltage drifts, and performance of the mirror surfaces of the micromirrors, which are affected by the shape or flatness of the mirror surface. Even under the best circumstances, when the micromirrors in the first and second arrays are accurately aligned and the other factors mentioned above are minimized, current cross-connects often lose 60% to 70% (about 4–5 dB losses) of the light passing through the system.

Although factors such as an incomplete reflection of infrared wavelengths from the mirror surfaces and poor coupling of fiber to lenses play a role in these losses, light scattering and other imperfections in the surfaces of mirrors are also significant factors. There is a current need for improvements in optical switching devices that will reduce the amount of losses in light outputted by such devices when compared with the amount of light inputted thereto.

Further improvements in optical switching devices, as well as in micromirror devices in general would be desirable as regards power consumption. The utilization of large mirrors relative to the size of the light beam can involve rapidly switching high voltages. One avenue for micromirror device improvement lies in continued miniaturization of the devices. In terms of performance, smaller sizes can improve power efficiency since smaller distances between parts and lower mass parts will improve energy consumption. In terms of manufacturing, continued miniaturization of mirror elements offers greater yields for a wafer of a given size.

Various aspects of the present invention offer improvement in terms of one or more of the considerations noted above. Of course, certain features may be offered in one variation of the invention, but not another. In any case, the advances offered by aspects of the present invention represent a departure from structural approaches represented by current micromirror designs.

SUMMARY OF THE INVENTION

The present invention involves micromirror structures, optionally used in adaptive optics or optical switches.

Micromirror array devices according to the present invention generally comprise a superstructure disposed over a substructure including addressing features. Features of the superstructure set upon and above the substrate include electrodes, hinges, micromirrors, support members or portions thereof. Support member pairs are provided to hold a mirror/micromirror above the hinge and the electrode features used to actuate it.

The invention involves supporting each micromirror element above its respective hinge portions at or along the sides or corners of the mirror. The hinge is then supported above the substrate by one or more features set at different/opposite corners or sides of the mirror with respect to the mirror supports The structures of the hinges and supports are designed to move in a continuous, controllable fashion simultaneously in two separate directions.

While the supports between the hinge and mirror portions are placed opposite each other, their location along each micromirror may vary. Preferred placement locations include opposite corners or sides of the mirrors. Generally, mirrors will have a polygonal plan in which the shapes are closely-packed (e.g., triangles, hexagons, and quadrilaterals such as squares, rectangles, trapezoids, parallelograms, and rhombi). In operation, the micromirrors are preferably operated in an analog fashion, rotating about an axis formed by each hinge or hinge portion, although operation in a digital fashion is contemplated.

The approach to mirror and hinge support or attachment described helps maximize available reflective surface area, Utilizing side-support features according to the present invention enables production of certain mirror face embodiments that are unbroken by light-scattering or non-reflective features. This approach and other useful design characteristics are described much more extensively in co-pending, commonly owned applications Ser. Nos. 10/269,796; 10/269,763 and 10/269,478, each filed Oct. 11, 2002 and each incorporated by reference herein in its entirety. Particularly, in connection with a side-supported mirror approach, manufacturing techniques are taught in which support precursor regions that are ultimately removed are temporarily located where space is to be opened upon releasing the individual micromirror elements of an array. As such, the space required for effectively depositing/forming support structures is not wasted but falls within space that must be left open anyway in order to allow mirror actuation. In other variations of the invention, more traditional columnar mirror supports formed within "vias" are provided. However, these are still located at opposite sides of a given mirror.

The present invention includes any of these improvements described either individually, or in combination. Additional optional features may be appreciated in connection with U.S. patent application Ser. No. 10/374,574, entitled "Micromirror Systems with Concealed Multi-Piece Hinge Structures," filed on even date herewith and incorporated by reference in its entirety. Systems employing micromirror devices including the improved superstructure form aspects of the invention, as does methodology associated with the use and manufacture of apparatus according to the present invention.

DEFINITIONS

Figure 1:
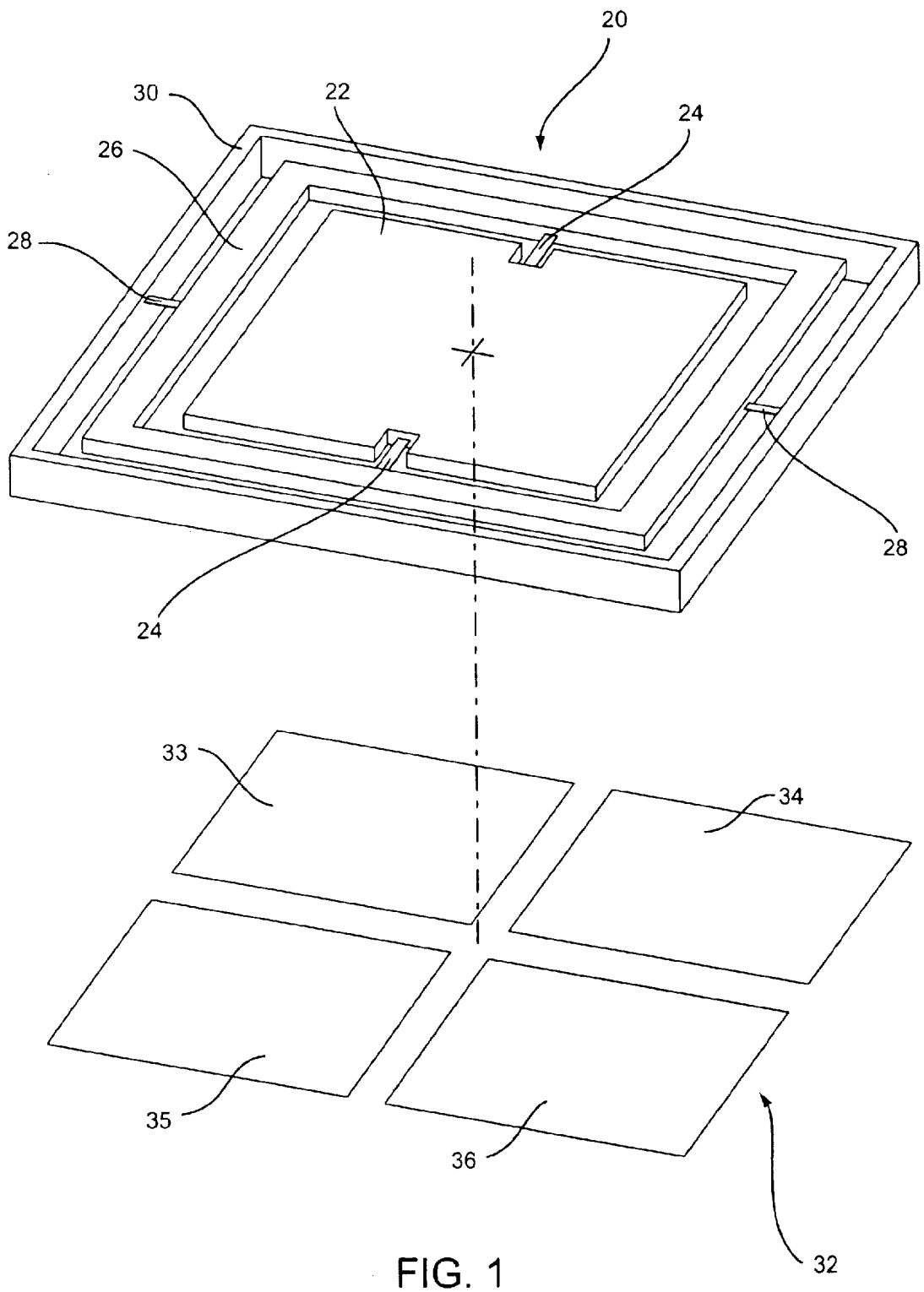
FIG. 1 is a perspective view showing prior art of a generic torsion bar mirror and gimbal assembly.

The phrase "beam steering" refers to operation of one or more micromirror devices in analog mode by charging address electrode(s) to a voltage corresponding to a desired deflection of the mirror to direct or "steer" the light reflected off the mirror in the intended direction.

The term "diameter," is defined herein to mean the distance across any long axis that may be defined. Stated otherwise, the diameter will correspond to that of any circle in which the structure can be circumscribed.

The phrases "dim space" or "dead space" refers to areas or spaces in the reflective surface(s) of a micromirror or micromirror assembly which are not reflective.

DETAILED DESCRIPTION OF THE INVENTION

In describing the invention in greater detail than provided in the Summary above, applicable technology is first described. Following this is a detailed description of exemplary micromirror devices and assemblies according to the present invention, as well as an exemplary process of production. Application of the invention as a programmable lens surface is also discussed. This discussion is followed by description of a known optical switching matrix and its function. Finally, the applicability of the micromirrors of the present invention to optical switch technology, as well as to other fields of adaptive optics is discussed.

Before the present invention is described in such detail, however, it is to be understood that this invention is not limited to particular variations set forth, as such may, of course, vary. Various changes may be made to the invention described and equivalents may be substituted without departing from the true spirit and scope of the invention. It is also to be understood that the terminology used herein is for the purpose of describing particular embodiments only, and is not intended to be limiting, since the scope of the present invention will be limited only by the appended claims.

Methods recited herein may be carried out in any order of the recited events which is logically possible, unless the recited language clearly indicates otherwise. Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Also, it is contemplated that any optional feature of the inventive variations described may be set forth and claimed independently, or in combination with any one or more of the features described herein.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a micromirror" includes a plurality of such micromirrors and reference to "the input" includes reference to one or more inputs and equivalents thereof known to those skilled in the art, and so forth.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Turning now to FIG. 1, a common type of multi-axis mirror is shown in simplified form; this type of design should be well known to those who have ordinary skill in the art. This is a mirror/gimbal device, and works by electrostatic attraction of the mirror to four individually controlled electrodes placed underneath the mirror surface. Restoring force to bring the mirror back to a central position and stabilize it at many intermediate positions is provided by torsion bars. FIG. 1 shows a single multi-axis mirror 20, consisting of a mirror surface 22 connected via two torsion bars 24 to a frame 26 that allows rotation around the Y axis. The frame 26 is in turn connected by two more torsion bars 28 to a stationary base 30. The frame and mirror assembly may then rotate around the X axis. Four electrodes 33 36, set in an array 32 can then be charged to various voltages to allow analog control of the position of the mirror in both axes. For instance, if electrode 33 is charged to a given voltage while electrodes 34, 35, and 36 remain uncharged, the mirror will rotate in both axes toward that electrode. By careful control of the voltages of each electrode, nearly any angle within the range of the device can be set on one particular mirror, as the two axes of motion are able to rotate independently.

This style of micromirror is most often used to steer a single beam of light, and is thus relatively large, that is on the order of 1×1 mm. The gimbal 26 only moves in one dimension, and the base 30 does not move at all, which makes these portions of the mirror unsuitable for control. In the figure, the gaps between mirror, gimbal, and base have been exaggerated for clarity, but still must exist to allow free movement of the constituent parts. In an array of mirror assemblies 20, a large percentage of the total surface of the matrix is unusable.

Figure 2:
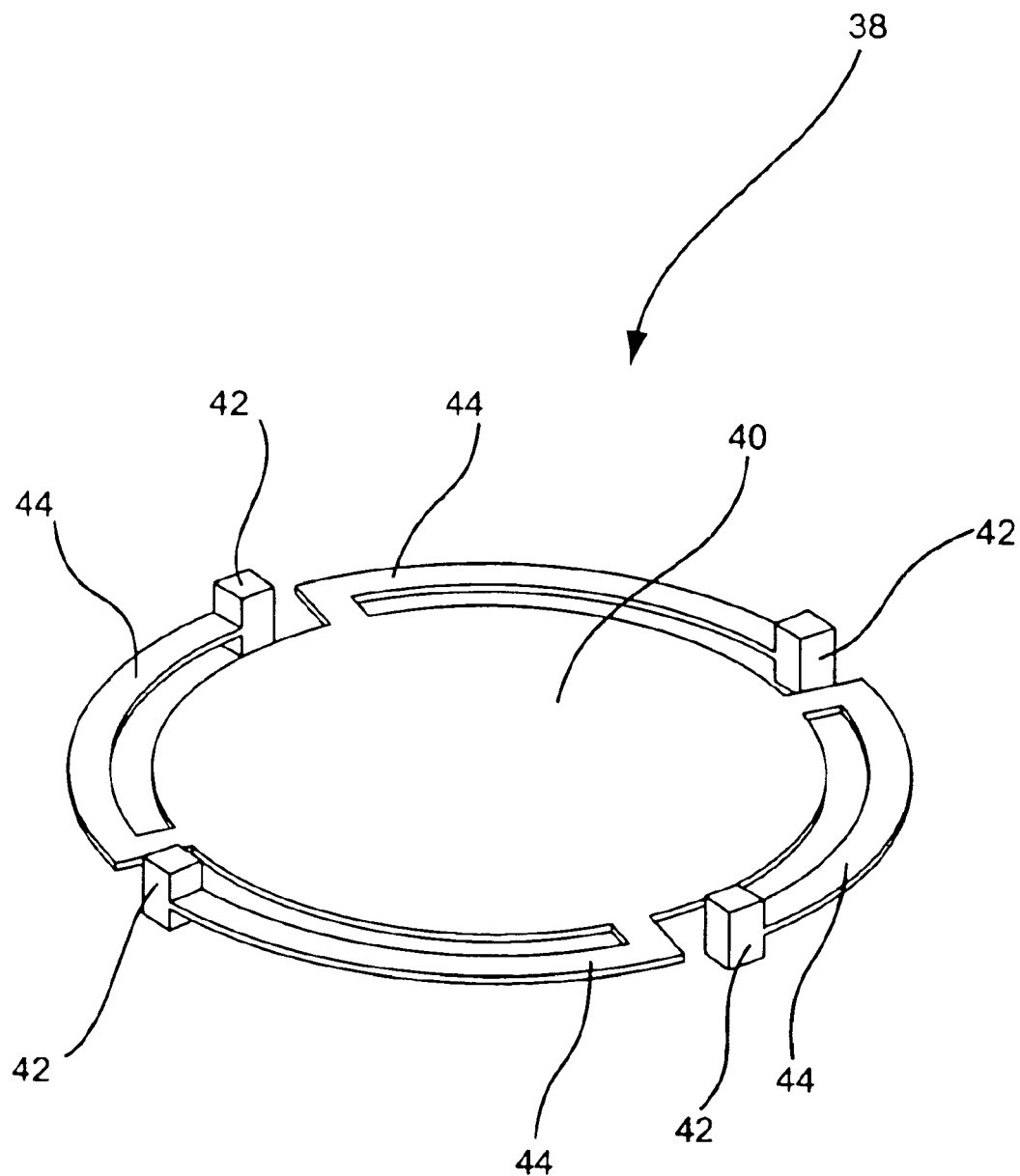
FIG. 2 shows a top view of prior art showing a single mirror using flexure hinges as part of an optical switching array.

FIG. 2 shows a different style of known micromirror 38, shown here in a simplified form. In this design, a mirror 40 is attached to a stationary base via four posts 42 by rotationally symmetric flexure bars 44. Here the primary restoring force is flexure as opposed to torsion, but the primary axes of movement are the same as the mirror shown in FIG. 1. The mirror is mounted over an electrode array 32 similar to that shown in FIG. 1. Once again, this type of mirror is designed to aim a single beam of light, so there is a significant amount of dead space between different mirrors used for the flexure bars and other parts of the stationary frame. Even for aiming discrete beams however, it would be advantageous for either of the systems shown in FIG. 1 or 2 for this dead space to be substantially reduced or eliminated. When packed in an array, mirrors such as this can direct hundreds of beams at once. With less dead space between mirrors, a greater number of beams could be switched with the same device, as the controllable angle for each mirror is limited.

Figure 3A:
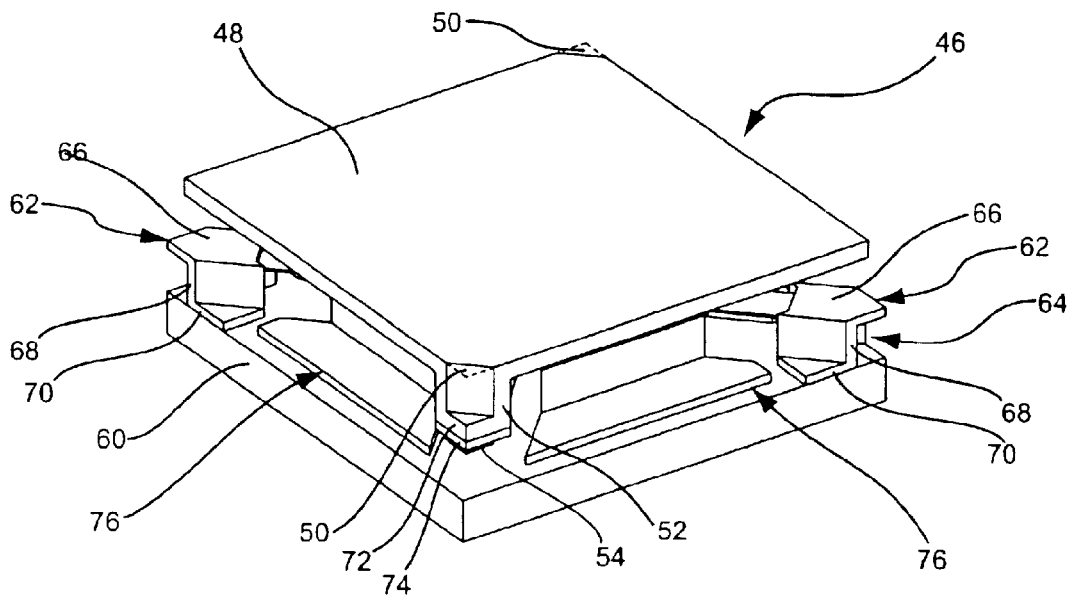
FIG. 3A shows a perspective view of the present invention in its preferred embodiment.

FIG. 3A shows a perspective view of a single micromirror device 46, which will be referred to for purposes of describing techniques for making the devices according to the present invention. The details of the materials employed, intermediate preparation steps and further constructional details associated with the methodology described are known by those with skill in the art, within the scope of reasonable experimentation by the same and/or may be appreciated by reference to the Background section noted above or the following U.S. patents: U.S. Pat. No. 5,083,857 to Hornbeck, entitled "Multi-level Deformable Mirror Device"; U.S. Pat. No. 5,096,279 to Hornbeck, et al., entitled "Spatial Light Modulator and Method"; U.S. Pat. No. 5,212,582 to Nelson, entitled "Electrostatically Controlled Beam Steering Device and Method"; U.S. Pat. No. 5,535,047 to Hornbeck, entitled "Active Yoke Hidden Hinge Digital Micromirror Device"; U.S. Pat. No. 5,583,688 to Hornbeck, entitled "Multi-level Digital Micromirror Device"; U.S. Pat. No. 5,600,383 to Hornbeck, entitled "Multi-level Deformable Mirror Device with Torsion Hinges Placed in a layer Different From the Torsion Bean Layer"; U.S. Pat. No. 5,835,256 to Huibers, entitled "Reflective spatial Light Modulator with Encapsulated Micro-Mechanical Element"; U.S. Pat. No. 6,028,689 to Michalicek, et al., entitled "Multi-Motion Micromirror"; U.S. Pat. No. 6,028,690 to Carter, et al., entitled "Reduced Micromirror Mirror Gaps for Improved Contrast Ratio"; U.S. Pat. No. 6,198,180 to Garcia, entitled Micromechanisms with Floating Pivot"; U.S. Pat. No. 6,323,982 to Hornbeck, entitled "Yield Superstructure for Digital Micromirror Device"; U.S. Pat. No. 6,337,760 to Huibers, entitled: "Encapsulated Multi-Directional Light Beam Steering Device"; U.S. Pat. No. 6,6,348,907 to Wood, entitled "Display Apparatus with Digital Micromirror Device"; U.S. Pat. No. 6,356,378 to Huibers, entitled "Double Substrate Reflective Spatial Light Modulator"; U.S. Pat. No. 6,369, 931 to Funk, et al, entitled "Method for Manufacturing a Micromechanical Device"; U.S. Pat. No. 6,388,661 to Richards, entitled "Monochrome and Color Digital Display System and Methods"; U.S. Pat. No. 6,396,619 to Huibers, et al., entitled "Deflectable Spatial Light Modulator Having Stopping Mechanisms. In any case, micromirror devices according to the present invention may be produced and/or operated according to the same details or otherwise.

Figure 3B:
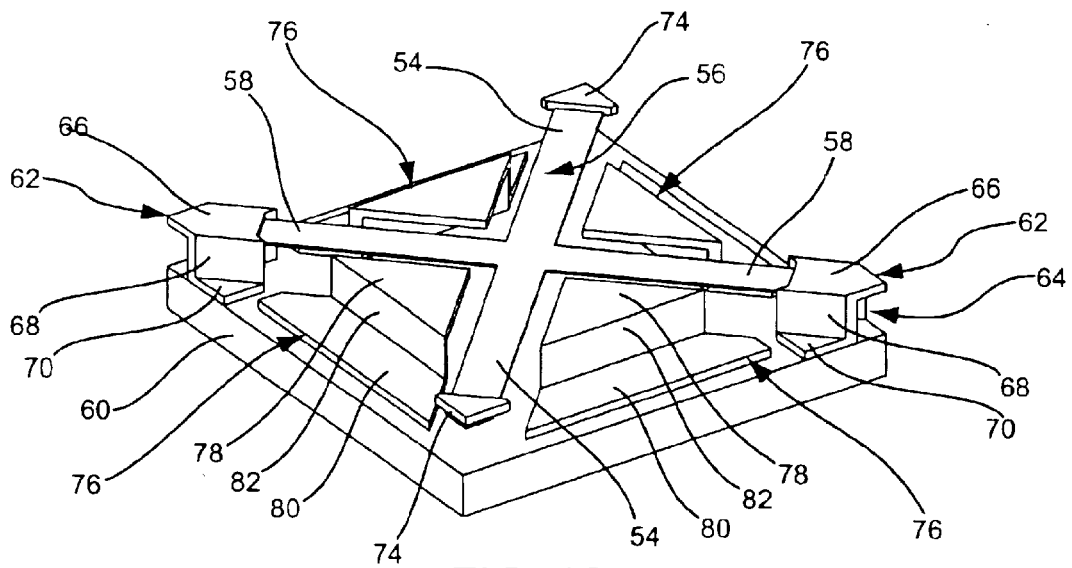
FIG. 3B shows the same views as FIG. 3A but with the mirror removed.
Figure 3C:
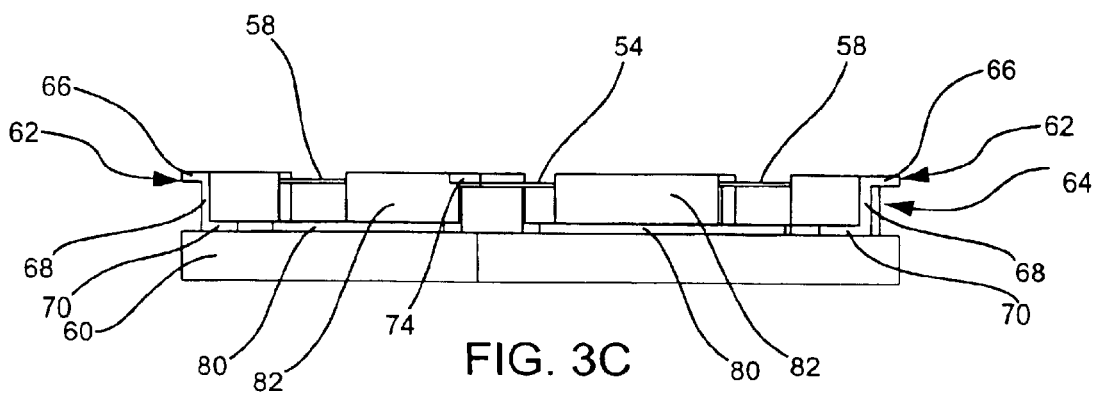
FIG. 3C shows the same element from as a side view.

Regarding the features of the present invention, FIG. 3A shows a micromirror device 46 according to the present invention. FIG. 3B shows the micromirror device 46 minus its mirror 48. FIG. 3C shows the same device pictured in FIG. 3B as a side view. The mirror surface 48 shown in FIG. 3A is uninterrupted, thereby providing superior reflection characteristics. While the "potential face" of the mirror surface 48 (indicated by solid and dashed lines together) may be somewhat larger than the actual face of the mirror (the area indicated by solid lines alone) reflection losses occurring from "dim" or "dead" space resulting from gaps 50 and the spaces between the individual micromirror devices 46 in an assembly of devices 46 is more than compensated for by the ability to orient the individual devices to direct light that would otherwise be lost due to scatter, misalignment, etc., as discussed above. Further, as described below, the "dim" or "dead" space resulting from gaps 50 may be minimized or even eliminated according to an aspect of the present invention with careful design of the mirror supports 52.

As an alternative to the mirror supports 52 columnar supports or posts (not shown) may be utilized which may be created by filling in vias produced in sacrificial material. As in other variations of the invention pictured, each of the pair of supports is positioned opposite one another and across the body of mirror 48. Supports may have a wall at the edge of mirror (each may have four walls or more or may define curved surfaces—depending on the original via shape that is filled-in to create the structure). Yet, the supports may be inset from the side/corner or edge of a mirror (depending on the style of micromirror device chosen) to which they are closest. However, it may be preferred to position the supports in such a way as to maximize hinge or torsion member length in view of the mirror style/format selected (i.e., square with corner support positions, hexagonal with corner supported positions, hexagonal with side support positions, etc.). In which case, the base of each support (or an intermediate structure) will be positioned at the end of any hinge portions. Further details about these support variations can be found in co-pending, commonly owned applications Ser. No. 10/269,796, entitled, "Micromirror Systems with Side-Supported Mirrors and Concealed Flexure Members," incorporated by reference, in its entirety, above (e.g., see FIG. 9A' in that application).

First, general features of micromirror device 46 under the mirror 48 are described. One such aspect concerns the manner in which mirror 48 is attached to its hinge. Supports 52 on opposite sides of mirror element 48 secure it to hinge portions 54 of hinge 56. Portions 58 of the hinge 56 defined are attached to substrate 60 by hinge joints 62 which underlie end portions (corners, in the example shown in FIG. 3B) of the mirror element 48. Thus, the hinge is elevated above the substrate to permit torsion about portions 54 and/or 58 as the mirror element 48 is tilted or rotated about various axes of rotation. The hinge joints 62 are bridge-type support structures, preferably open underneath the hinge center 64, which is attached to a spanning segment 66 between vertical support segments 68. Feet 70 may additionally be provided to stabilize the support structure. Yet another option is to produce support segments 68 at an angle relative to the surface of the substrate (i.e., having both vertical and horizontal components).

As shown, hinge 56 is a unitary crossed bar structure which forms a "universal joint" type of connection. This not only provides a solid support for the mirror, but also allows creation in a single step of a hinge that can move in two axes. A base 72 of each support 52 may directly connect each hinge portion 54. Alternatively, an intermediate layer or nub 74 of material (e.g., serving as a bonding interface) may be is employed, as shown in FIGS. 3A–3B.

In any case, the device is configured so that the hinge is set some distance (as little as about 0.1 micron, or less) above the surface of substrate 60 and mirror 48 is set some distance (as little as about 0.1 micron, or less) above the hinges (as little as about 0.2 micron, or less, above the surface of substrate 60). Avoidance of a central yoke that holds the mirror structure allows creation of very low profile micromirror devices by the invention that are still able to attain high deflection angles (typically about +/−10 deg., even upwards of about +/−15 deg., to about +/−20 deg. or more). Of course, mirror/micromirror devices according to the present invention may be advantageously manufactured on a larger scale (even using MEMS techniques) and may utilize other actuation techniques, including electromagnetic, electrostatic, thermo-mechanical or piezo-based approaches.

An aspect of the invention that facilitates provision of adequate electrostatic attraction in response to hinge restoring forces that increase with angular deflection has to do with the configuration of electrodes 76. The electrodes may be configured with a plurality of portions 78 and 80 (or more) at different levels. Whether provided in a series of steps by continuous members (as shown with a support portion 82 between each stage 78/80), by steps formed with discrete members or a continuous angled member, the electrodes are configured so that portions further from the center or point of rotation of the mirror are at a lower level. In this configuration, all four electrodes 76 are of nearly identical shape, with small deviations from each other to allow for different sizes of mirror support base 72 and hinge support 62. Similar electrode shapes and areas simplify the process of actuating a multi-axis mirror system, but other configurations of electrode shapes and sizes, including asymmetric variants are possible.

The electrode configuration shown with higher portions closer to the center and lower portions more distant provides clearance for the mirror as it is tilted at an angle. Furthermore, the configuration provides for sequential attraction of mirror 48. When the mirror is angled away from a set of electrodes, the upper electrode portion is the first to exert significant attractive electrostatic force on the mirror (in light of the inverse squared relationship between electrostatic attraction and distance between objects). As the upper electrode portion(s) effectively attract the mirror drawing downward (i.e., towards the upper electrode portion), the influence of the electrode lower portion(s) increase as the distance between the lower portion(s) and the mirror decreases. Further aiding attraction of the mirror to its full angular displacement is the increased mechanical advantage or lever arm offered at more remote regions of the mirror interacting with lower electrode portion 80. This and other variants of possible electrode shapes are explored more fully in application Ser. No. 10/269,763, entitled "Micromirror Systems with Electrodes Configured for Sequential Mirror Attraction," which is incorporated by reference herein in its entirety.

Device 46 is actuatable to move in a plurality of axes. Advantageously, the scale of the present invention may be made is much smaller than currently available micromirrors, with the diameter of each mirror element being on the order of magnitude of 10–20 microns, or more. An array of hundreds or thousands of these micromirrors may be used to replace a single mirror element having a scale on the order of those shown in FIGS. 1 and 2. A greater number of micromirrors for each portion of the incoming wavefront provides for much more customization of the properties of the outgoing wavefront. Miniaturizing the individual mirror size carries a number of other benefits which will be detailed later. Nevertheless, it is contemplated that the size of the mirror diameter may be increased to as high as about 1 mm or more, with dimensions of other components of the device having increased dimensions in proportion thereto. This would allow a single mirror element of the present invention to effectively control an entire light beam.

Figure 4A:
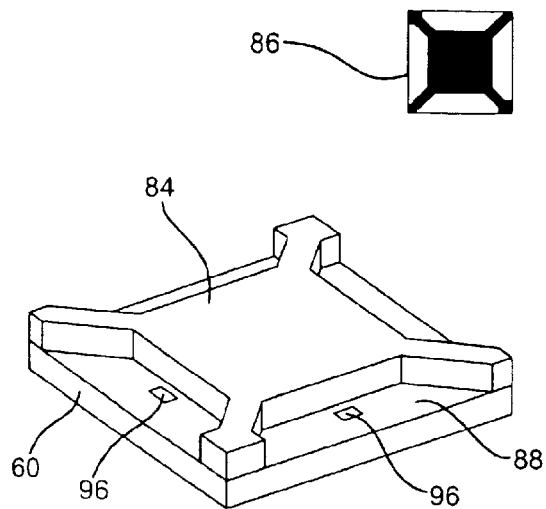
FIGS. 4A–G show a process for making the device shown in FIG. 3.
Figure 4B:
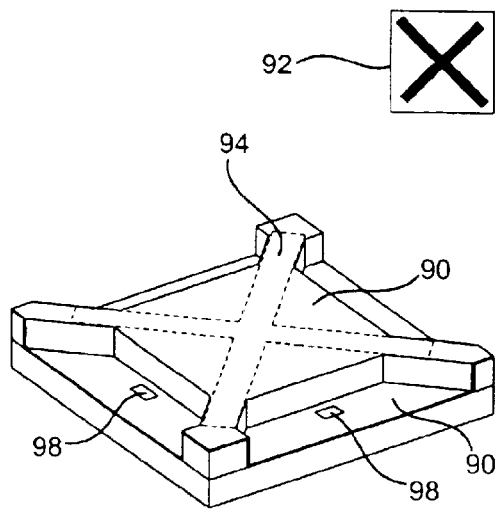

A manner in which a micromirror device 46 according to the present invention may be produced is illustrated in FIGS. 4A–G. Of course, the process steps employed will vary depending on which inventive features are actually employed in a given variation of the invention, as would be readily apparent to those of ordinary skill in the art. In FIG. 4A, a sacrificial layer of material 84 is set upon substrate 60. It is patterned with a first mask 86 to define a substrate-level portion 88 upon etching. In FIG. 4B, a hinge metal layer 90 is deposited over the entire surface including a portion of the sacrificial layer. A second mask 92 is utilized in defining a passivation layer (not shown) over the region(s) of layer 90 serving as a hinge precursor region 94. Metal layer 90 fills in vias 96 provided in substrate 60 to form a connection 98 between underlying address circuitry beneath an oxide layer of the substrate. The same approach to addressing and substrate construction may be employed as described above, or another manner of electrical control of device superstructure produced may be utilized. This holds true with respect to connectivity between the device elements as well as the configuration of substrate 60.

Figure 4C:
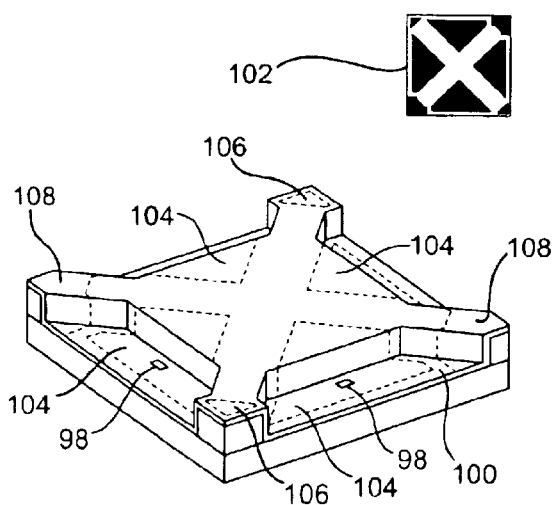

As shown in FIG. 4C, a thicker layer of conductive material 100 is deposited over the hinge material. This layer builds-up the electrodes 76 and nubs 74, and hinge supports 62 for hinge portions 58. Layer 100 also further fills in vias 96 and connecting structures 98. A third mask 102 is employed to define a protective layer (not shown) over the region of layer 100 serving as electrode precursor(s) 104, nub precursors 106, and hinge support precursors 108.

Figure 4D:
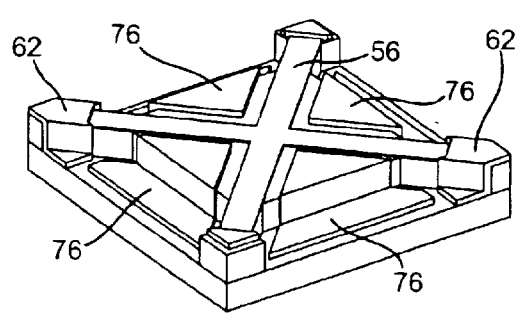
Figure 4E:
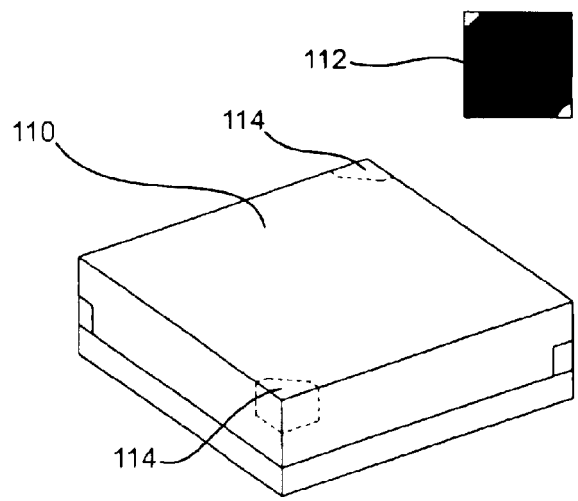

In FIG. 4D, layers 90 and 100 are shown selectively etched to reveal hinge 56, support spanners (hinge supports or anchors) 62, and electrode portions 76. In FIG. 4E, one can see another sacrificial layer 110 which then covers these structures. A fourth mask 112 is used to pattern sacrificial layer 110 to form support precursor regions 114 upon etching the sacrificial layer.

Figure 4F:
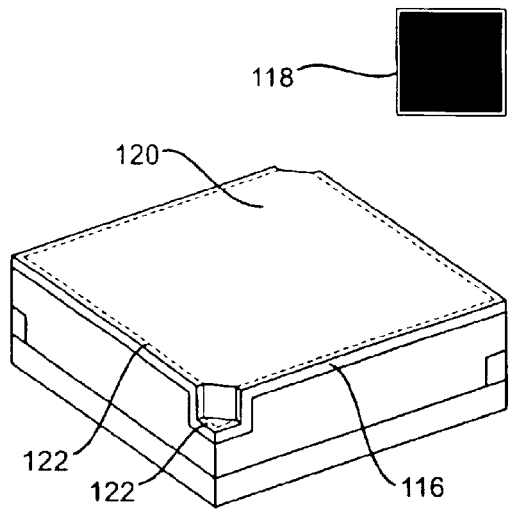

FIG. 4F shows sacrificial layer 110 as it is selectively etched, and then coated with a layer 116 of conductive material suitable to serve as a mirror (or a substrate that may be subsequently coated with a highly reflective metal or dielectric material). A fifth mask 118 is used in order to define a passivation layer over mirror precursor regions 120 to be retained, but not the adjacent borders 122, which are removed to form spaces between adjacent micromirrors 46.

Figure 4G:
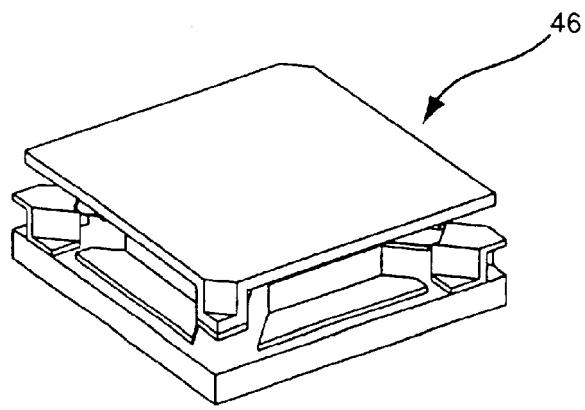

FIG. 4G shows a micromirror element 46 according to aspects of the invention after all sacrificial materials have been removed. As discussed above, the mirror is supported at or along its opposite sides or edges by supports attached to a hinge, which is in turn supported above the device substrate. In addition to being placed at opposite sides/portions of the mirror, the support members may be characterized as being "open" in nature. Progressive or dual-stage electrodes are shown as well.

Figure 5A:
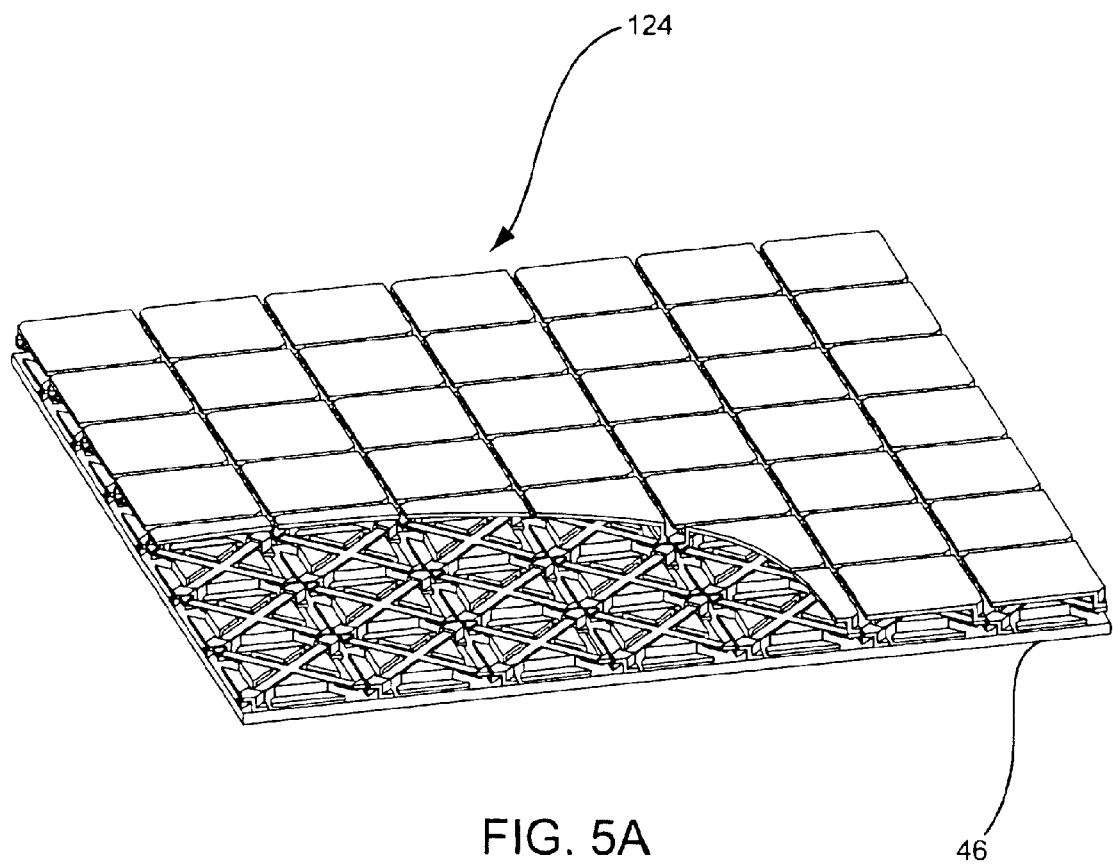
FIG. 5A is a perspective view of a sample 7×7 array of mirrors shown in FIG. 3 with some of the mirror tops removed.

FIG. 5A shows an exemplary 7 by 7 array assembly 124 of micromirrors 46. Part of the tops of the surface of the mirrors 48 have been removed to show the underlying structures. This type of mirror array, comprised of potentially millions of individually controlled mirrors can be used for a number of applications. Not only can the micromirrors 46 of assembly 124 be positioned to mimic a tilting of micromirror device 20 about either of its tilt axes (or some combination of both) and thus represent a flat reflective surface, but the micromirrors 46 can be independently positioned to form a "smart surface", i.e., one that can be adapted to modify the shape of a reflected wavefront, in response to a given wavefront that is made incident thereon. For this reason, the assembly 124 can be described as a "Fresnel mirror" or a "programmable lens". FIG. 5A can also be seen as only a small section of a much larger array.

Figure 5B:
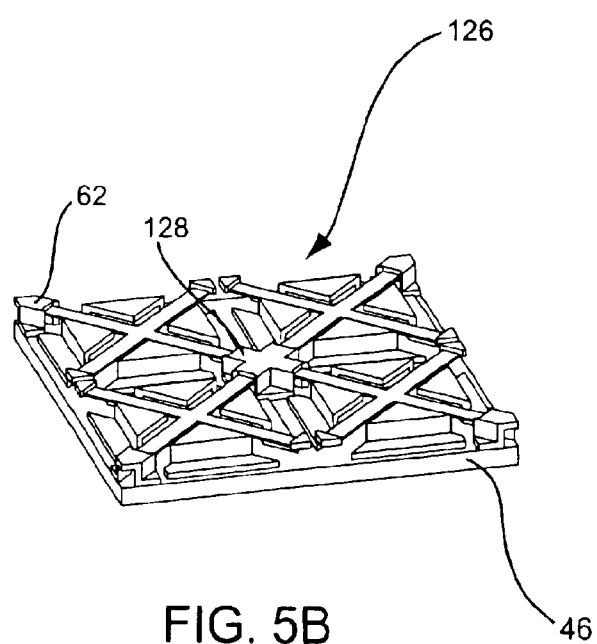
FIG. 5B is a perspective view of a 2×2 array of another example of micromirror devices, with the mirror tops removed.

Array 124 as shown in FIG. 5A has some advantages because of its simplicity in layout. Additionally, addressing for this layout would be consistent for each mirror element 46. However, it may be preferred to use a different layout of mirror elements 46 as shown in FIG. 5B. Here, a smaller 2 by 2 section of a slightly different array 126 is displayed. In this configuration, the mirror elements 46 are identical to the previous array 124, but the orientation of the elements 46 varies. Every other mirror element 46 is rotated by 90° in a checkerboard pattern. The main advantage is seen in the position of the hinge supports 62, for which each support 62 meets at a corner with three other supports 62 to make one large support 128. Large support 128 reduces the number of discrete features to be manufactured, and is more structurally stable than individually manufactured supports 62 In addition, because it is a combined structure instead of four free standing pieces, the overall dimensions of the support can be made smaller, which can lead to longer hinges and more mobility of the hinge.

Figure 6A:
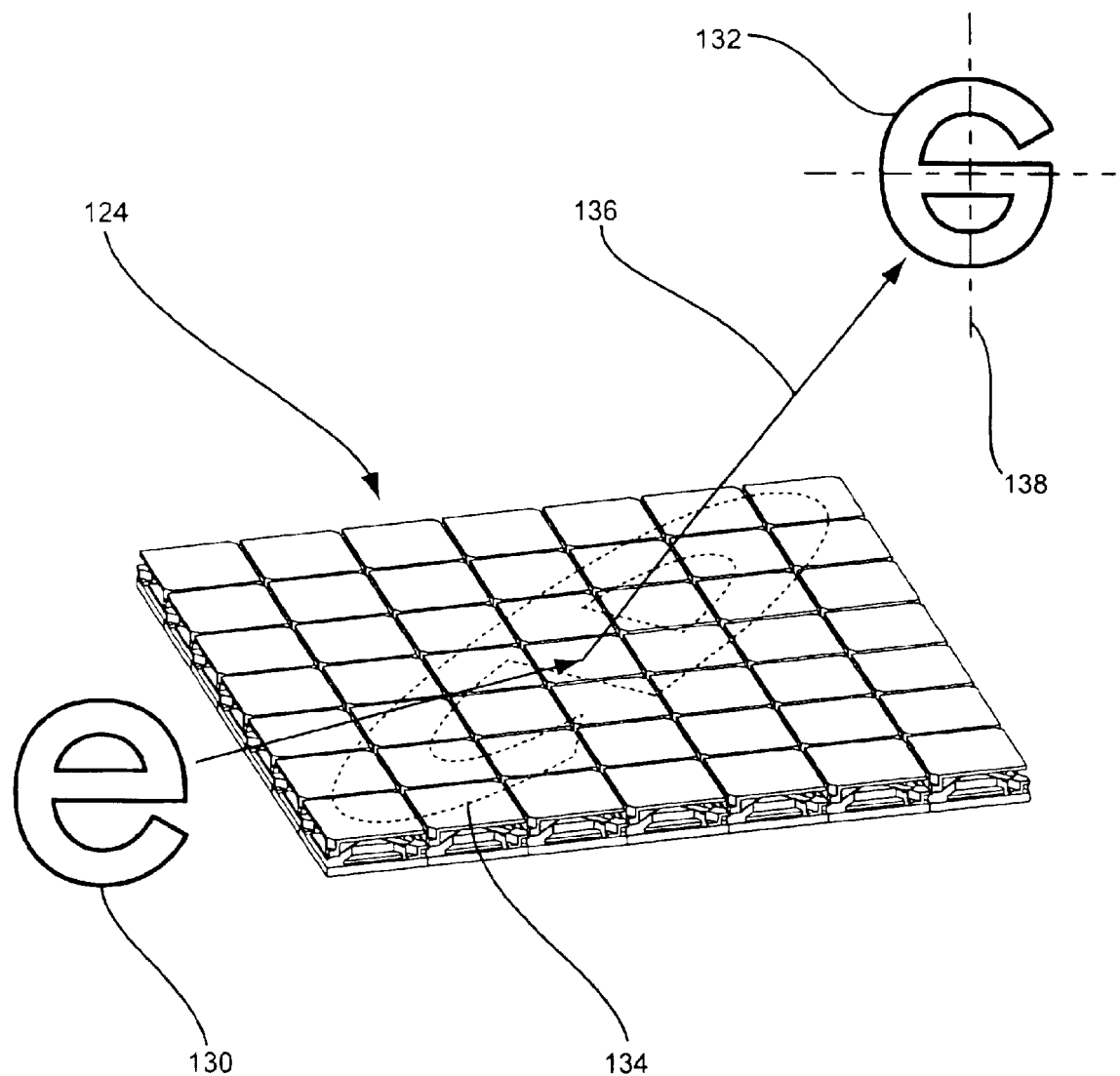
FIGS. 6A–E are perspective views showing the array of FIG. 5A used as a programmable "Fresnel mirror".

Micromirror arrays 124/126 provide great versatility in their ability to form surfaces for performing wavefront correction/shaping, and by their ability to be oriented to form other than flat surfaces, including configurations which form effective programmable lenses. Examples of such configurations are shown schematically in FIGS. 6A–6E. FIG. 6A displays the same array assembly 124 as seen in FIG. 5A. For illustrative purposes, a lowercase "e" 130 is used as a sample object to be reflected off mirror assembly 124. The image 132 results from the particular configuration of the micromirrors. A dotted line 134 portrays where the "e" is reflected on the mirror surface, and the path of light follows an arrow 136. In FIG. 6A, the array is set completely flat, so there is little change in the image other than simple reflection. For comparison to later figures, the image 132 is set against a reference set of crosshairs 138.

Figure 6B:
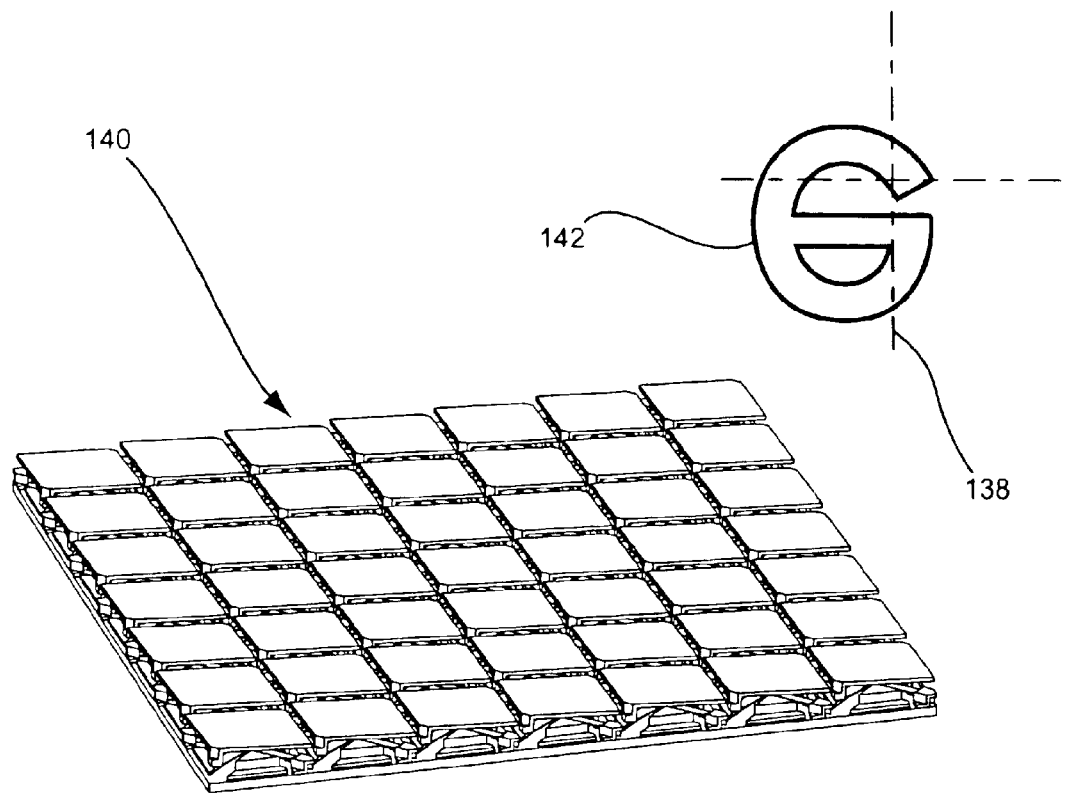
Figure 6C:
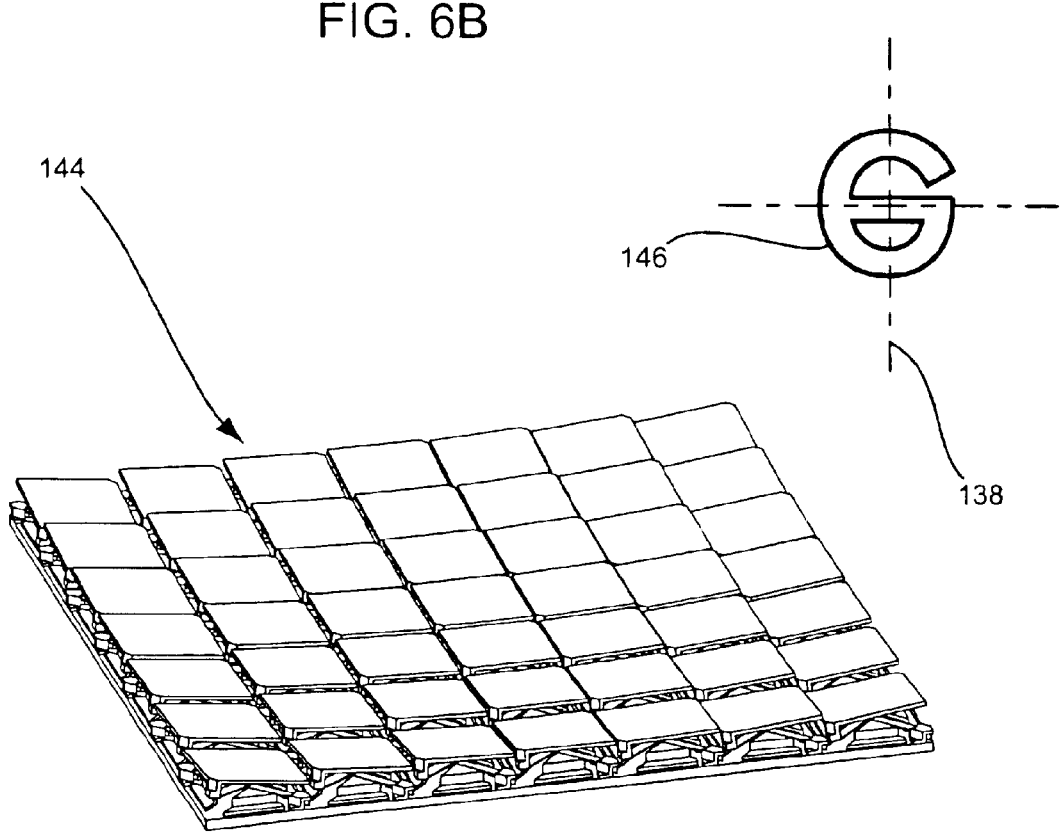

For simplicity, FIGS. 6B–E will all use the same object 130 as seen in FIG. 6A, which will be omitted in these figures. Only the final image 132 will be shown. FIG. 6B shows mirror array 140, which is the same array as 124, but with all of the mirrors tilted in the same direction. The image 142 size is unchanged, but its position has moved. Thus the array 140 acts here as a tilting flat mirror. FIG. 6C displays an array 142, once again the same array 124, but this time individual elements 46 are tilted to approximate the surface of a focusing mirror, as can be seen in the resulting image 146, shown having a reduced size.

Figure 6D:
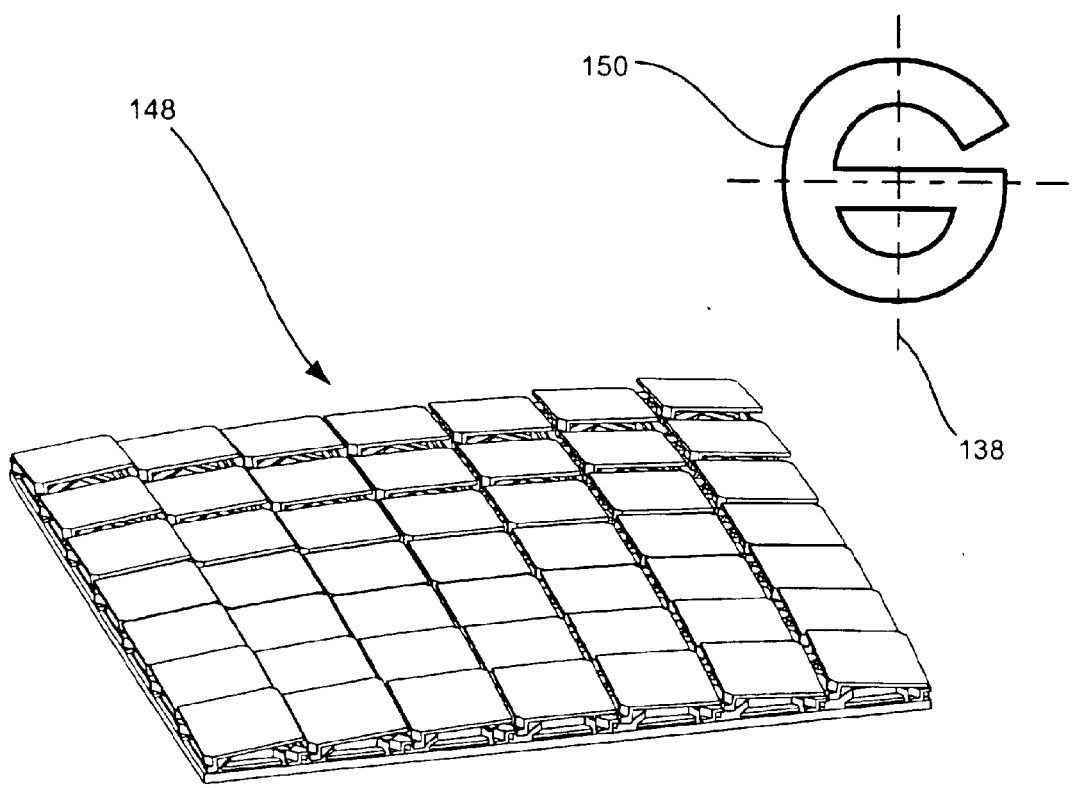
Figure 6E:
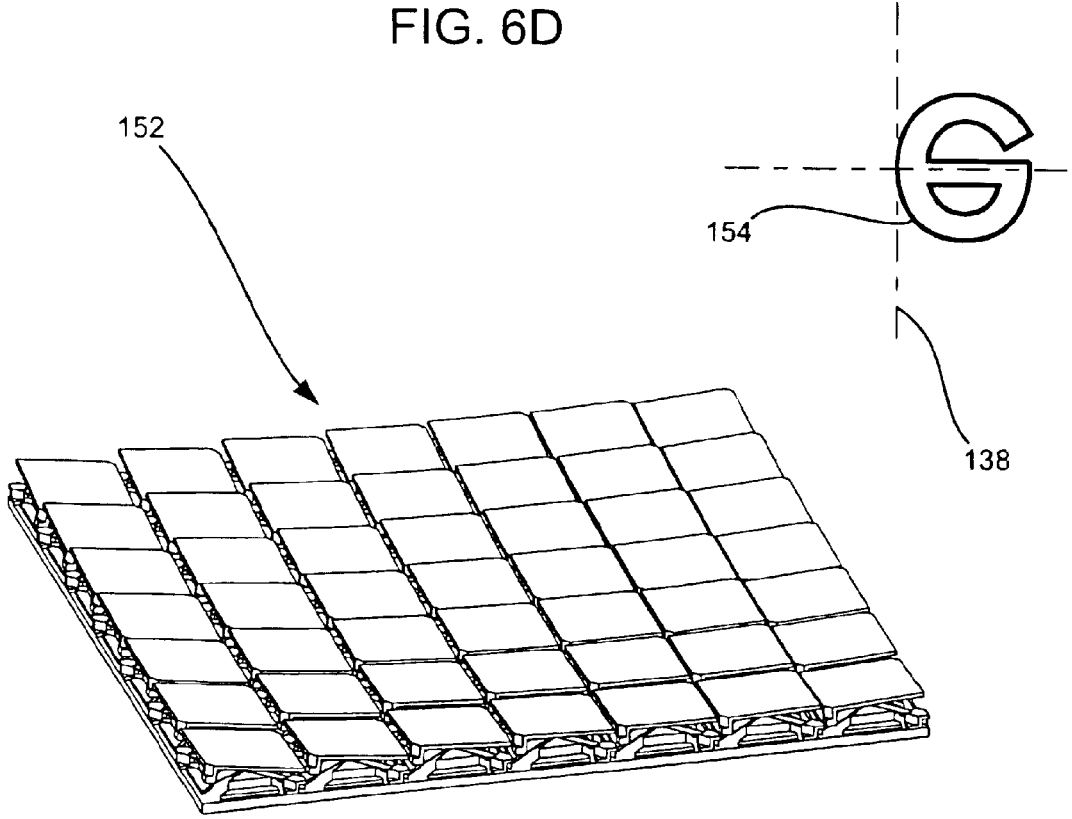

FIG. 6D shows a similar array 148 that is now set with mirror elements 46 approximating a defocusing mirror, which again can be seen in a correspondingly larger image 150. In FIG. 6E, array 152 displays both tilt and focus on the same set of mirrors, with the results showing up in image 154. Because each mirror element can be set independently of each other, potentially several types of correction could be implemented simultaneously. Although tilt and focus can be addressed on the same set of mirrors, note that this leads to some limitations. Depending on the dimensions of the components, tilt angles of individual mirrors might be only as much as 10° in each axis. However, tilt angles of some designs may be as large as 20° or more. If a set of mirrors is tilted acting as a flat mirror so that all of the mirrors are near or at their maximum angle, it will not be able to further focus or defocus the beam. In addition, tilting of curved surfaces can lead to astigmatism in the reflected beam, although this can be corrected by careful shaping of the programmable lens at the specified angle.

Although they are not shown here, many other types of wavefront shaping are possible. Various types of lenses other than spherical can be created, such as cylindrical or parabolic mirrors. Distortions in the incoming beam due to imperfections in earlier surfaces can be detected and corrected. Any number of other surfaces can be created subject to the angular limitations of the micromirrors.

In practical use, such a small subset 124 of a much larger mirror array would not be used for shaping beams or images, but this size is used here for illustrative purposes. The mirrors in a somewhat larger portion of the array shaped in this manner would not be seen as clearly to have a curvature because the differences from one mirror to the next would be slight. One advantage to the independently addressable nature of these mirrors is that the array as a whole can be divided into many fields, each with their own properties. One simple way to accomplish this is to use a defined grid, where the center of each subsection of the grid is set to be the center of a programmable Fresnel mirror, each with its own focal length and tilt angle. The present invention is not limited to this manner of controlling the micromirrors. Any arbitrary number or shape of field may be independently controlled.

Another important application of the present invention is in the area of switches for optical networking. Looking at FIG. 7, a schematic representation of a switching matrix 154 is shown. For simplicity of explanation and drawing, only a linear matrix 154 is shown, although two-dimensional matrices are also commonly used. The matrix of FIG. 7 includes two arrays 156, 166 of steerable micromirrors (158, 160, 162 and 168, 170, 172, respectively). Each of the micromirrors are "steerable" by their operation in analog mode, which involve actuation of micromirrors 158, 160, 162, 168, 170, 172 to a voltage corresponding to a desired deflection of the mirror surface of the micromirror, as is known to those of ordinary skill in the art.

In this way, each of the three micromirrors 158, 160, 162 can be tilted about an axis of rotation so as to direct an optical signal received from its input channel (163, 164, 165 respectively) toward any one of micromirrors 168, 170, 172 that corresponds to the output channel 173, 174, 175 that is desired to be outputted to. Input and output channels are often optical fibers with focusing optics. For example, micromirror 158 can be oriented to reflect an input signal received from input channel 163 to micromirror 168, which, in such instance, is also tilted to optically couple the output from micromirror 158 with optical output fiber 173. Alternatively, the voltage can be varied to the electrode(s) of micromirrors 158 and 172 so that they are optically coupled with one another in which case the optical input from optical input fiber 163 is outputted to optical output fiber 175, and so forth. U.S. Pat. No. 6,389,190 describes a switching matrix of the type shown in FIG. 7 in detail, including an example of MEMS micromirrors that may be employed in the construction of such a switching matrix.

As noted in the Background section of the present application, currently available optical switching mechanisms experience a significant loss of the optical signals passing from an input to the output thereof, i.e. on the order of a 60% to 70% loss. Significant contributions to these losses are due to scatter of light from the light signal as it passes from an input optical fiber to first and second mirrors (in input and output mirror arrays) and finally to an optical output fiber. Aberrations in the surfaces of the micromirrors on the input and output arrays can contribute to the scattering of light as well as to deformation of the light beam to the extent that a portion of the light beam can become misaligned with the output optical fiber by the time that the input optical signal (light beam) has been reflected off an input side micromirror and an output side micromirror. Misalignment of the fibers to the mirrors can be a significant source of loss, in addition to loss coupling into the output fiber due to mismatched beam sizes.

Figure 7:
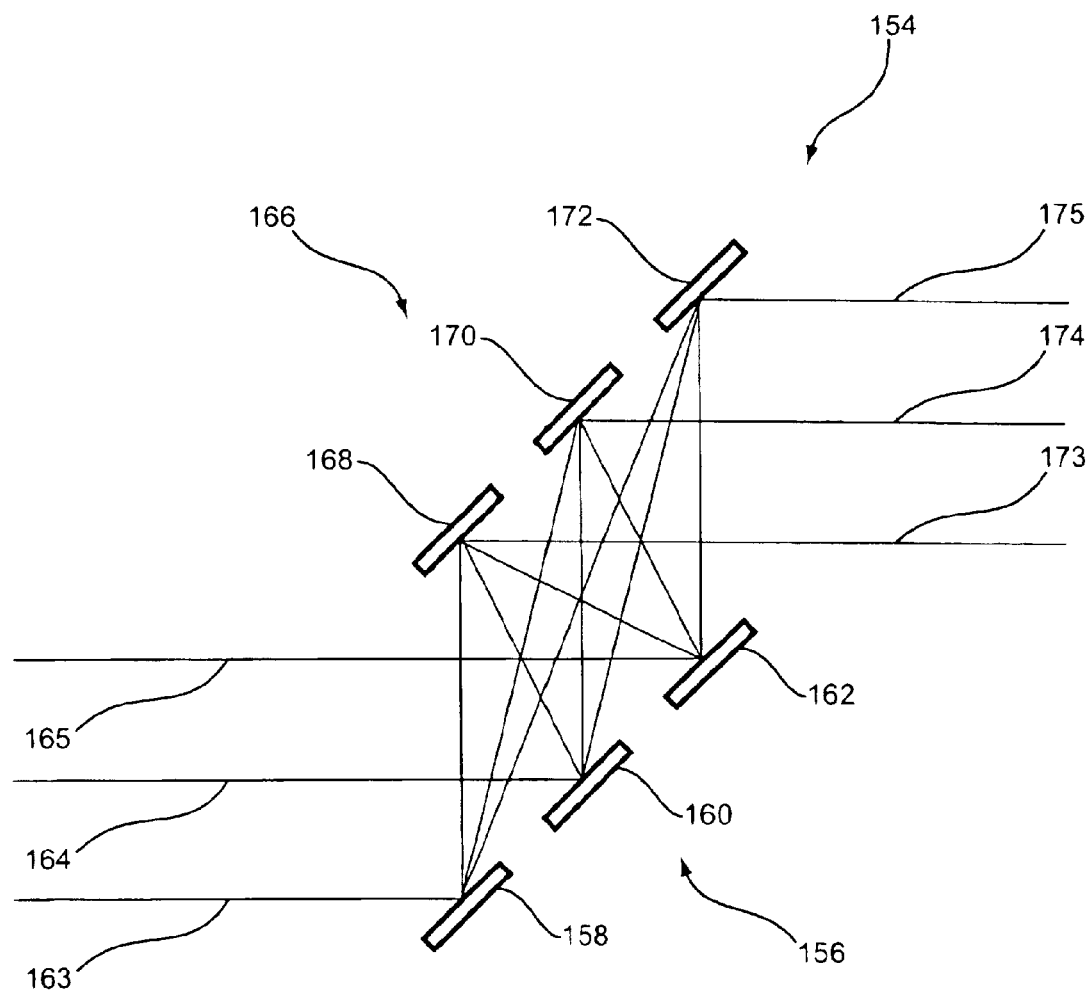
FIG. 7 is a top view of a simple linear 3 by 3 optical switch showing the mirror elements and light beams.

Another source of error can be created if the tilt axes of the input and output mirrors are not parallel in an arrangement such as shown in FIG. 7, although this primarily affects only arrays of mirrors that only have a single axis of movement. In such a case, opposing input and output mirror surfaces of input and output side micromirrors, which are intended to be aligned to optically couple an input optical fiber and an output optical fiber, can never be aligned in parallel, which results in a skewing of the optical beam such that a portion of the output signal does not enter the output optical fiber. Similar negative effects can occur due to thermal and other environmental effects, as well as aging of the components.

Figure 8:
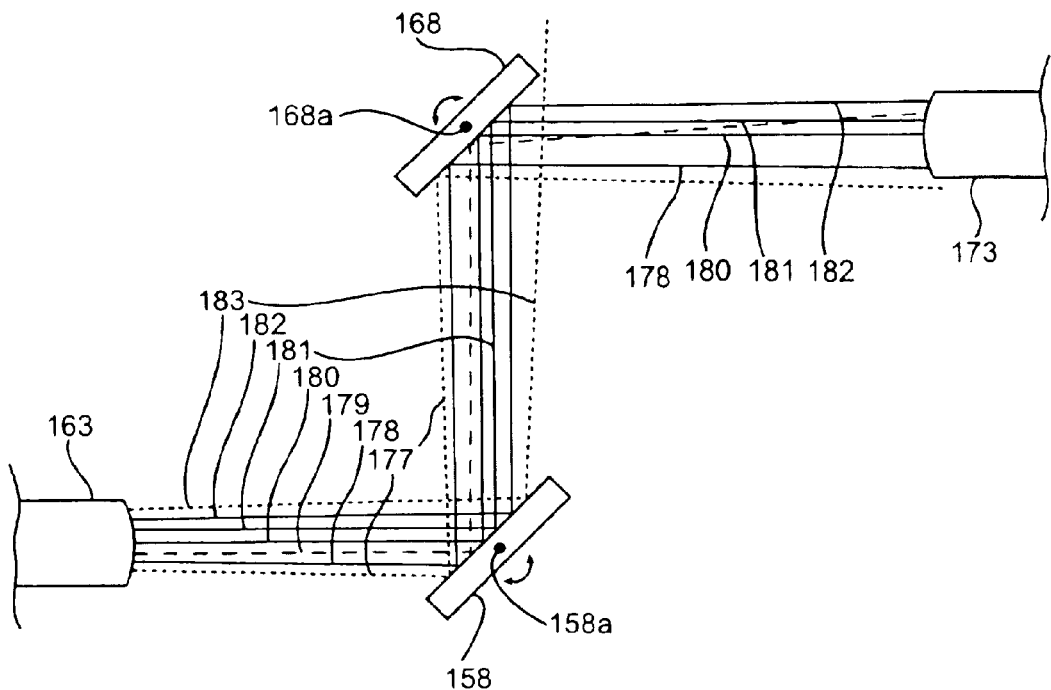
FIG. 8 is a close up view of a single light path of FIG. 7, including optical fiber coupling using a single mirror switching device.

The present invention can be applied to optical switching configurations to correct for, and thereby substantially eliminate sources of losses due to misalignment of mirrors, imperfections in mirror surfaces and other physical causes of light loss through a switching mechanism. FIG. 8 is a schematic, two dimensional representation of a switching arrangement which shows only one micromirror device (158, 168 respectively) from each of the input and output arrays, for simplicity of discussion. An optical input signal is incident upon micromirror device 158 as delivered by input channel 163. Seven light rays 177–183 representing parts of a single light beam are schematically represented in FIG. 8 as being incident on the mirror surface of micromirror device 158, from which they are then reflected toward micromirror device 168 and are then directed to output channel 173, where 158a and 168a represent the axis of rotation of these mirrors. In this example, light rays 177 and 183 become misaligned with the mirror surface of micromirror device 168 due to expansion of the beam hitting the mirrors. Similarly, light ray 179 is misdirected and is not delivered to output channel, due to light scattering which may be caused by a lack of flatness in the mirror surface of micromirror device 158 or other malformation which causes misalignment of the light reflecting off of a portion of the mirror.

Note that although the micromirror devices 158 and 168 are adjustable by tilting about axes 158a, 168a, that any further adjustment of the micromirror devices 158, 168 in FIG. 8 would not result in a reduction of light loss. For example, if micromirror 158 were tilted by a slight rotation in the clockwise direction, then ray 183 might be directed onto the surface of micromirror 168, but at the same time, ray 178 might then miss the reflective surface of micromirror 168, and certainly ray 177 would still not be reflected off of micromirror 168. Similarly, while rotation of micromirror 168 in the counter clockwise direction might direct ray 177 into the optical output channel 173, it would also misdirect ray 178 at the same time, so as to no longer be channeled into the output channel 173.

Figure 9:
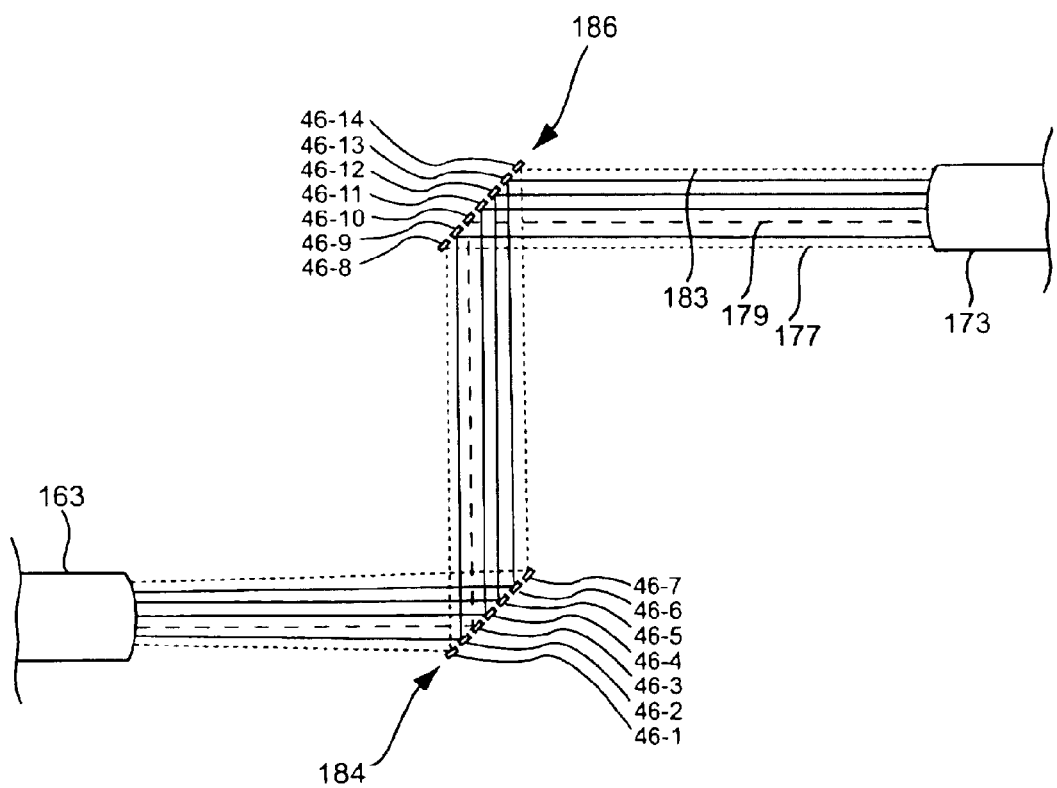
FIG. 9 is a close up view of a single light path of FIG. 7, including optical fiber coupling using a multiple mirror switching device.

By replacing each of the micromirror devices 158, 168 with a plurality of smaller and more controllable micromirror devices 46 as shown in FIG. 9 according to the present invention, a micromirror assembly (184, 186, respectively) is provided to replace each of the micromirror devices 158, 168 of FIG. 8. Each micromirror assembly is made up of a plurality (seven, in the non-limiting schematic example shown) of micromirror devices 46 (labeled here as 46-1 through 46-14), each of which is independently controllable for movement of a mirror surface about two axes of rotation independently, or about an unlimited number of axes of rotation defined by the resultant vectors occurring when rotating to varying degrees about both axes of rotation. In the example shown, the micromirror device 46-1 has been rotated or tilted in the clockwise direction so as to align ray 177 with the corresponding micromirror (46-8) on assembly 186, so that ray 177 is now properly channeled to the optical output channel 173. It is noted that the rotation of micromirror 46-1 is shown in an exaggerated fashion for purposes of explanation, and that the actual rotation of the mirror would be much less, so as to be essentially imperceptible, while having the effect of "flattening" the reflective surface in this location for reflecting the ray 177 in the correct direction. Similarly, micromirror 46-7 is tilted or rotated somewhat counterclockwise, so as to accurately direct light ray 183 to be incident upon micromirror device 46-14, which in turn directs the ray 183 into the optical output channel 173. The micromirror device 46-3 in assembly 184 has been tilted or rotated in the counterclockwise direction to redirect ray 179 into the proper position on assembly 186 to permit proper direction into the output channel.

In this particular example seen in FIGS. 8 and 9, the light beam from optical input channel 163 is shown slightly expanding to illustrate details of the present invention. In an actual system, the light beam would be carefully focused to keep the spatial profile of the beam as small as possible throughout the length of the optical switch. By keeping the beam size small, the size of the individual mirrors and the spacing between them can be made smaller as well, which allows for a high density switching matrix. This is desirable, since MEMS micromirror designs generally have a limited usable angular range of movement, so a greater density leads directly to a higher port count in the switch. Changing the beam size in this manner has several adverse consequences however. Even if all of the rays are focused so that they hit the focusing lens at the output channel, the outgoing angle of each ray (177-183) may not be best for good coupling efficiency into the fiber. Adjustment of both of the switching mirrors for best coupling does not eliminate much of the loss. To accommodate for relatively large spacing between the mirrors, often a long distance between mirrors is needed. Maintaining small beam spot sizes throughout a longer distance requires very good uniformity of focusing elements on the incoming beams. These constraints can make it difficult to create a working device with a high port count when using large flat mirrors.

By providing a plurality of independently adjustable micromirrors 46 to form each micromirror assembly (such as 184 and 186), input and output arrays of these assemblies can then be constructed in making an optical switching or cross-connect apparatus which is capable of reducing the amount of light loss, as compared with those currently available. The ability to independently adjust devices 46, in effect, gives the assemblies the ability to optically adapt to the wavefront of the optical signal that is being received, and to manipulate that wavefront to maximize the amount of the signal which is ultimately received at the output end of the switching device. The reflective surfaces of the micromirrors 46 in assemblies 184 and 186, as has been previously mentioned, can thus be used as programmable Fresnel mirrors to focus the light received and reflected so as to minimize losses. It is much easier to keep light focused properly over a short distance as opposed to a long distance. Using a plurality of mirrors allows any focusing element after an input fiber to be optimized for only a short distance to the first mirror array. The first mirror array can focus properly to the second mirror array, and the second mirror array will then focus properly for good coupling into the output fiber.

Figure 10:
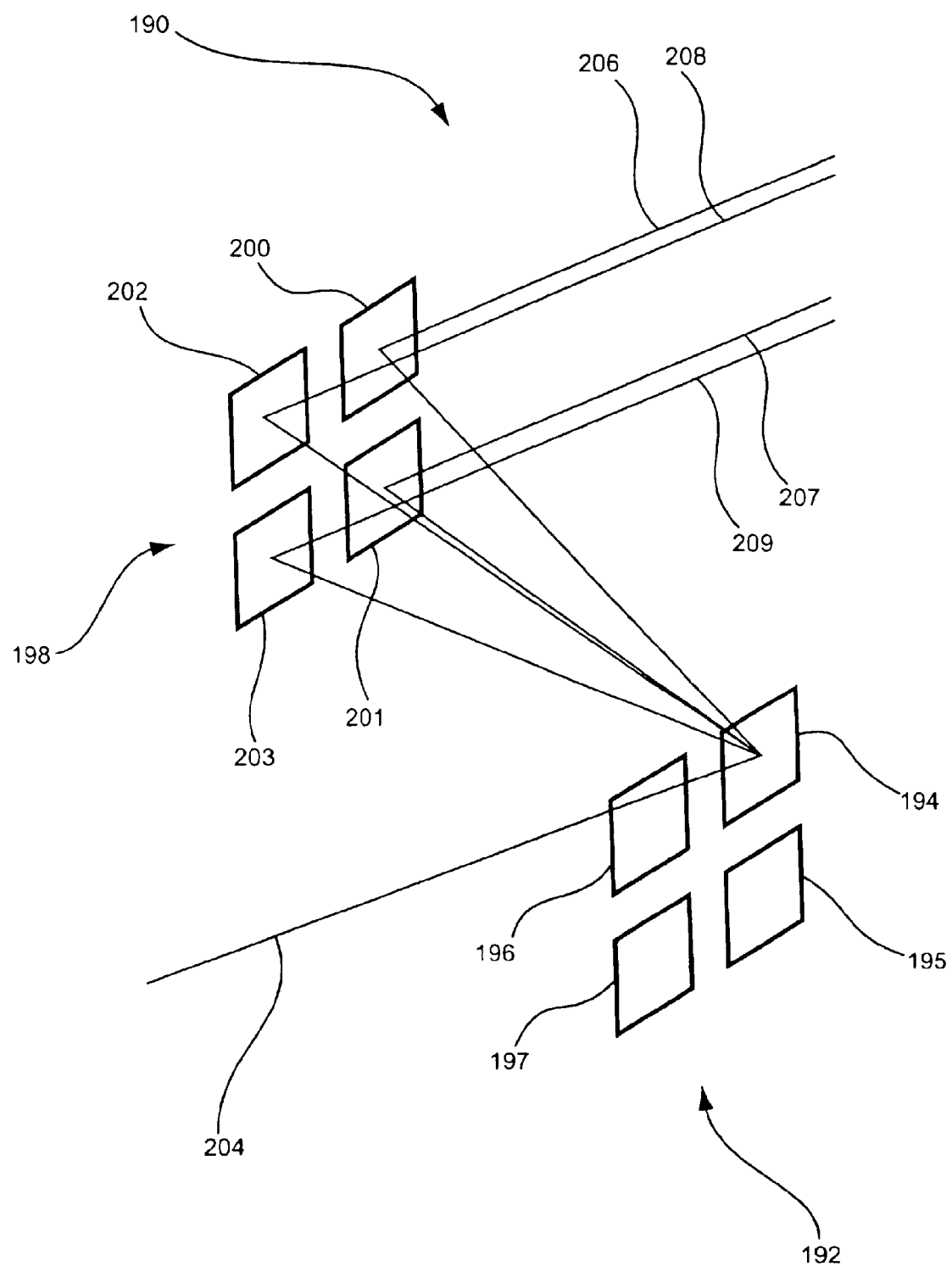
FIG. 10 is a perspective view of a three-dimensional 4 by 4 optical switch showing the mirror elements and light beams.

Although a small amount of light is lost due to the spacing between the micromirror devices 46 in each array, this loss is small compared to the amount of light that would ordinarily be lost by a system such as shown in FIG. 8, but which is recaptured by proper orientation of the micromirrors 46 as discussed with regard to FIG. 9. Although the example of FIG. 9 has been described with regard to a one dimensional assembly of micromirrors 46 to form the assemblies 184, 186 (ie., a 1×7 array of the micromirrors 46 in each assembly), it is to be noted that the present invention is in no way limited to such arrangement, as such arrangement has been described only for purposes of simplicity. In fact, the more likely assembly is to include a two-dimensional array of micromirrors 46 to form each assembly, even with a switching setup as shown in FIG. 7. For example, a micromirror device 20 can be replaced by a 10×10 or 100×100 array of micromirrors 46 to form an assembly such as the array 124 shown in FIG. 5. Because the micromirrors 46 have the ability to tilt or rotate about two axes (or combinations thereof, as noted above) it is preferable to form a two-dimensional array of the micromirrors in each assembly, for three-dimensional redirecting, or focusing, of incident light signals FIG. 10 is a schematic representation of a three-dimensional cross-connect arrangement 190. In this arrangement, the micromirror devices can be three-dimensionally positioned so as to optically connect any micromirror in the optical input array 192 with any micromirror in the optical output array 198. Thus, for example, by appropriate position of micromirror 194 and a corresponding micromirror in the optical output array 198, the optical input 204 can be directed to be outputted to any of optical outputs 206-209 by appropriate optical connection of micromirror 194 with respective ones of optical output micromirrors 200-203. Each of input side micromirrors 195-197 has similar possibilities, with the appropriate corresponding adjustment of the output micromirrors.

Figure 11:
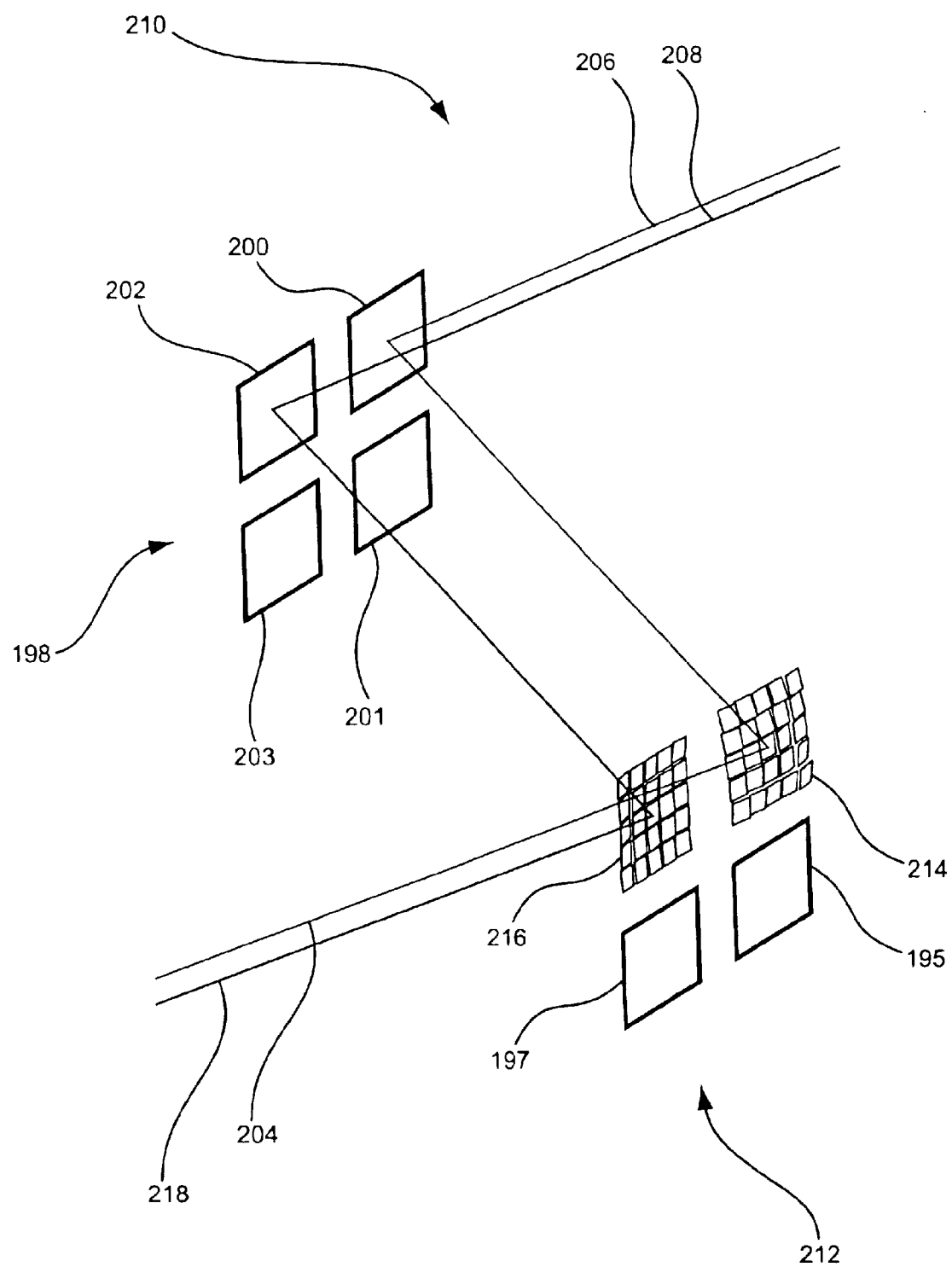
FIG. 11 is a perspective view of the same switch as shown in FIG. 10, but with two mirrors replaced by multi-mirror arrays.

FIG. 11 is a three-dimensional cross-connect 210 similar to the cross-connect 190 in FIG. 10, but with two of the mirror elements 194 and 196 being replaced by exemplary 5×5 arrays 214 and 216. Replacing the single mirror elements has a number of advantages already addressed, but which may be more apparent as seen in this figure. In this example, the two arrays are set to act as two different focusing elements for the beams being switched. If input beam 204 has slightly changed focusing characteristics than input beam 218, the array elements can be adjusted independently to maximize the coupling efficiency. Most often, the input beams of an optical switch are focused coming out of an optical fiber by either a lens array or an individual lens on each fiber. Uniformity of focal lengths for these lenses can be very difficult to achieve, yet small changes in the consistency of these lenses can have a large effect on the focusing of the beam, and thus on the efficiency of coupling light back into the output fiber. Using a small array of mirrors to act as an additional lens element as a part of the optical path allows for slight changes in the input beam without sacrificing power throughput into the output. In an actual system based on these designs, all of the rest of the input and output mirrors 195, 197, 200-203 would be represented by a similar array of micromirrors.

Another advantage of the multimirror array is that of positioning. In a single mirror system as shown in FIG. 10, each input fiber must be precisely aligned to the center of its corresponding mirror along with all the other input fibers. Small irregularities may make the input beam clip on the edge of the mirror or miss it altogether. Individual adjustments of each fiber and/or focusing components is commonly not possible, so much of the time, the entire array of input fibers and lenses are aimed to find the best compromise position, even though throughput oil many of the channels suffers as a result. Achieving exact uniformity is no simple task. One possible solution for this problem is to make the size of each individual mirror in the arrays 192 and 198 larger. While this reduces the problem of losing power from the beam at the edges of each mirror, it does have the drawback of lowering the density of the mirror array as a whole, which, as has already been discussed, will lower the total port count of the switch. In FIG. 11, a single mirror is replaced by an array of mirrors. In actuality, each single mirror would be replaced by an array of mirrors with no particular boundaries between the original surfaces of the single micromirrors, but which was displayed in this fashion for clarity. In FIG. 11, between array 214 and 216 would appear a number of identical mirrors; in aggregate, all of the mirrors would make a single large array. If the center of a single fiber was tilted incorrectly by a small amount to change the position of its input beam on the mirror array, this new location could be chosen as the center of its steering set of mirrors with no extra loss to the beam falling off an edge. Of course, uniformity of the input fibers and beams cannot be so poor as to overlap parts of more than one beam at any one place on the array as a whole, but small changes that would adversely affect performance on single-mirror systems will not harm throughput here. In addition, the lack of boundaries for the array domain of a single light beam allows a tighter spacing of the beams, which as has been mentioned previously, would allow for a higher density switch with greater port count.

FIG. 5A showed an assembly of micromirror devices 46 that comprise the present invention which form a micromirror assembly 124 effective to replace micromirror device 194 (or any of the other micromirror devices 195-197 and 200-203) in FIG. 10, although this size of array is not limiting. A typical micromirror device currently used in the optical switching field employs a mirror surface having width and length dimensions of about 1mm×1mm. Using present techniques, micromirror devices 46 according to the present invention may be made to have a mirror surface as small as about 8 microns by 8 microns. Thus, an assembly of 15,000 micromirrors (i.e., a 125×125 array) could be provided to replace a single micromirror device in the prior art. As noted previously, the present invention is not limited to this size of micromirror, as micromirrors having dimensions larger than 8 microns by 8 microns can certainly be made, such that an assembly having a plurality, but a lesser number than one hundred micromirror devices 46 could be assembled to replace a single known micromirror device. Also, it is contemplated that even smaller micromirror devices 46 will be possible as the state of the manufacturing arts progresses.

Figure 12A:
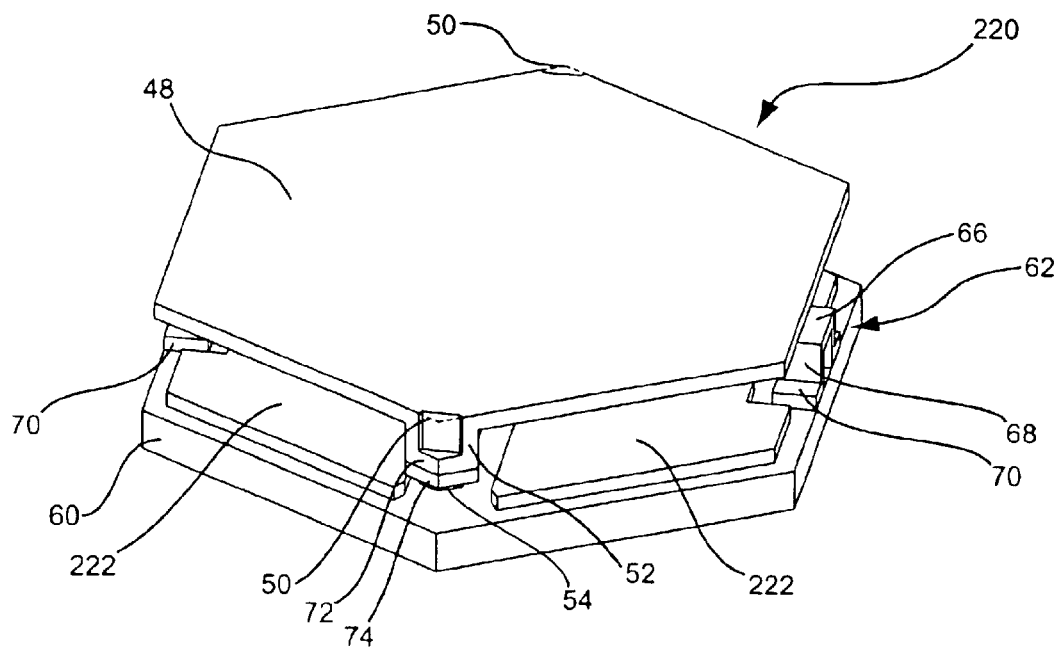
FIGS. 12A–C show the same views of a variant element of FIG. 3 using a hexagonal mirror with side mirror supports and corner hinge supports.
Figure 12B:
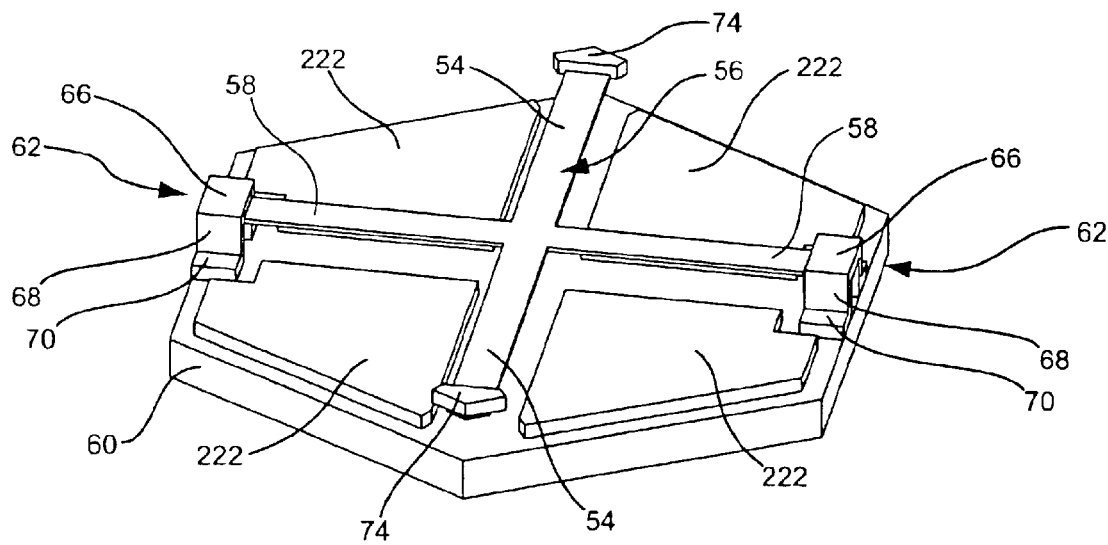
Figure 12C:
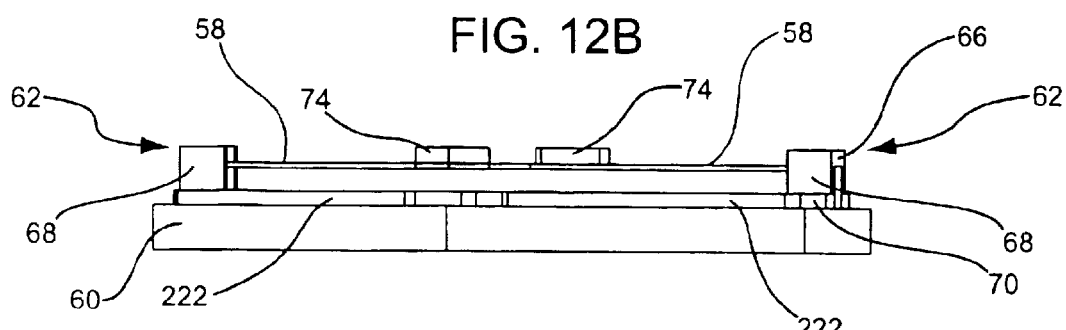

A number of other variants to the design of the present invention are possible other than the one shown in FIG. 3. FIGS. 12A–C provide details of a micromirror 220 with a hexagonal-shaped mirror top supported at opposite corner positions. Its construction and appearance closely resemble the micromirror elements 46 shown in FIGS. 3A–C, and views for each part of the figure are the same. However, the hexagonal mirror format offers certain advantages in use. For one, they can be closely packed in a manner like a honeycomb, where sequential rows (or columns) overlap. Such overlap provides the ability in image creation to mimic higher resolution output where there is overlap. The principles of such operation are well documented and may be understood in reference to U.S. Pat. No. 6,232,936 to Gove, et al., entitled "DMD Architecture to Improve Horizontal Resolution." In this variant of the device, the hexagonally shaped mirror is attached to the hinge portions 54 at its corner supports 52, and the hinge portions 58 are attached to hinge supports 66 on the side of the hexagonal substrate 60. This type of structure has another advantage in manufacturing, as the substrate supports for the hinges 66 on the side can be shared by adjacent hexagonal pixels. One simple variant for this design, (not pictured here) is to switch the relative positions of the mirror supports and the hinge supports. That is, the supports 52 for the mirror can be connected at the side of the mirror, and the supports 62 for the hinges can be connected to the substrate 60 at opposite corners.

One other difference in this design is shown in the electrode design. In this design, a single flat electrode 222 replaced each staggered multi-level electrode 76, described in previous examples. Although a staggered electrode may be preferred in that less voltage should be needed to achieve the same degree of electrostatic attraction, the single, flat design may be preferred for manufacturability purposes, as this electrode may be simpler to use for any of the micromirror designs presented here. Of course, the electrode design described with regard to the example in FIG. 12B is not limited to the micromirror shown in FIG. 12B, but may be applied to any of the other designs described herein.

Figure 13A:
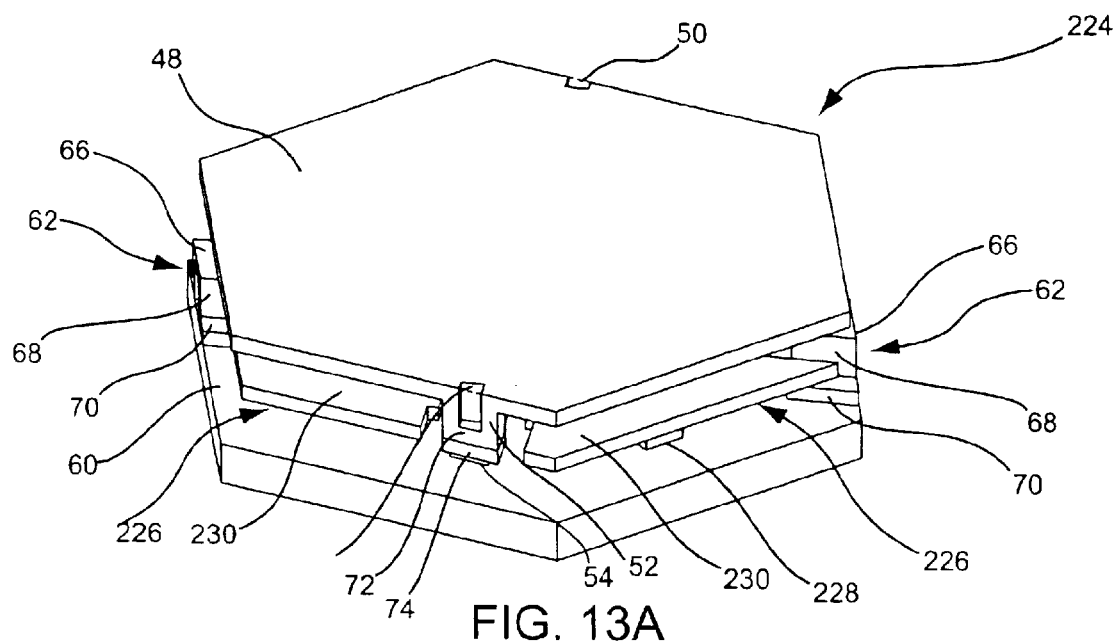
FIGS. 13A–C show the same views of a hexagonal mirror element with side mirror and hinge supports.
Figure 13B:
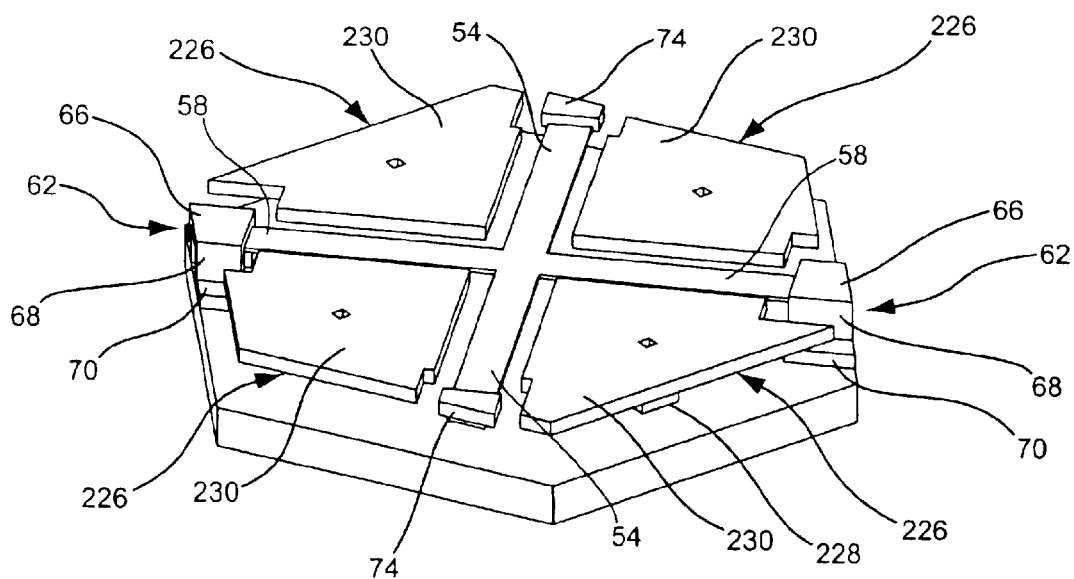
Figure 13C:
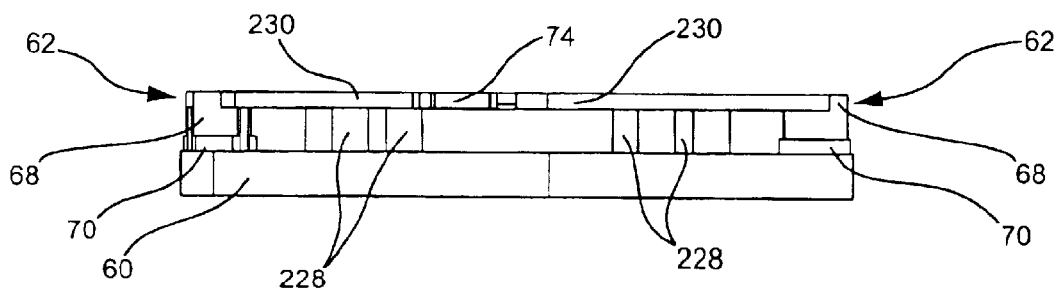

FIGS. 13A–C display yet another variation in mirror design. Assembly 224 is also a hexagonal mirror design, where both mirror and hinge support legs attach at the sides of the hexagon. Although any position along the side could have been chosen, in this case the crossbar hinge was rotated 15° from the axis aligned from opposite corners of the hexagon. One advantage of this configuration is that the lengths of the hinge portions 54 and 58 may be made to be substantially the same, and thus should provide nearly the same restoring force in each direction. Another variant in electrode design 226 that may be applied to any of the other mirror variants is illustrated in FIG. 13B. Using a via column 228, the entire electrode surface 230 is raised close to the mirror. This configuration allows for the maximum electrostatic attraction of the three designs.

Note that regardless of the choice of electrode configuration on any of these variants, the hinges, mirror, and electrodes have been designed not to interfere with each other. Because the hinge and electrode layers are constructed at the same time, there is no overlap between them. At the mirror's maximum angular extension in both axes, the mirror touches down only on the substrate 60 or on the hinge supports 62. While in normal operation, the mirror and attached metal structure are charged up to a bias voltage, and the addressing electrodes are charged to a different voltage, there is no danger that the structures will short out and potentially damage or disable one or many other mirrors.

Figure 14A:
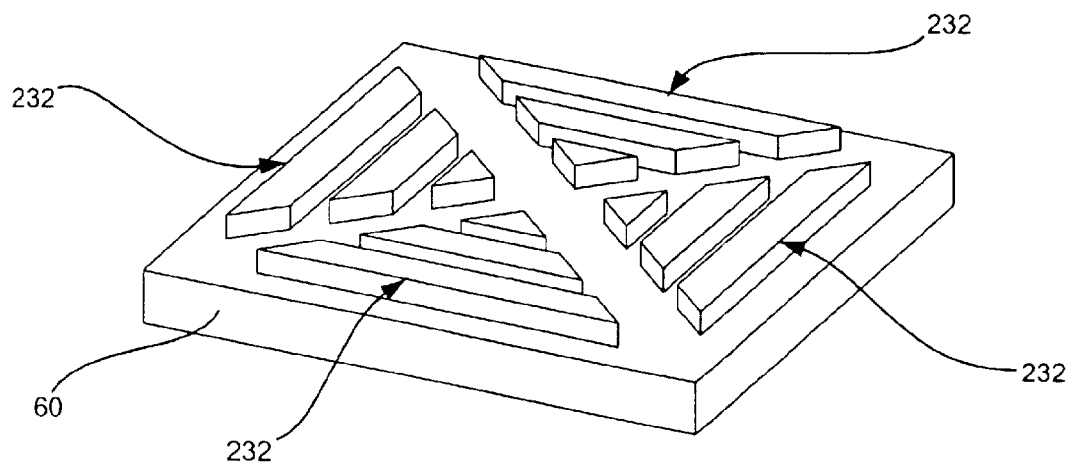
FIGS. 14A–C show several types of segmented electrode designs with varying heights.
Figure 14B:
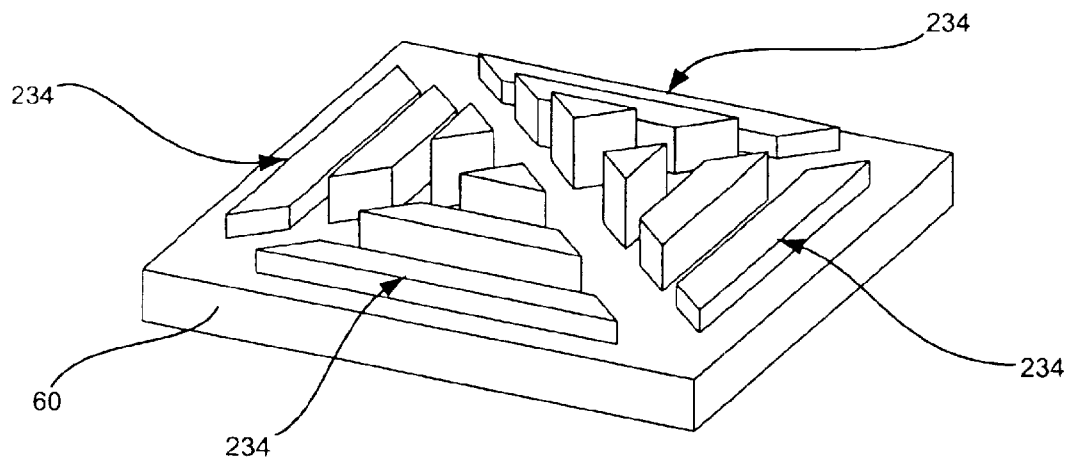
Figure 14C:
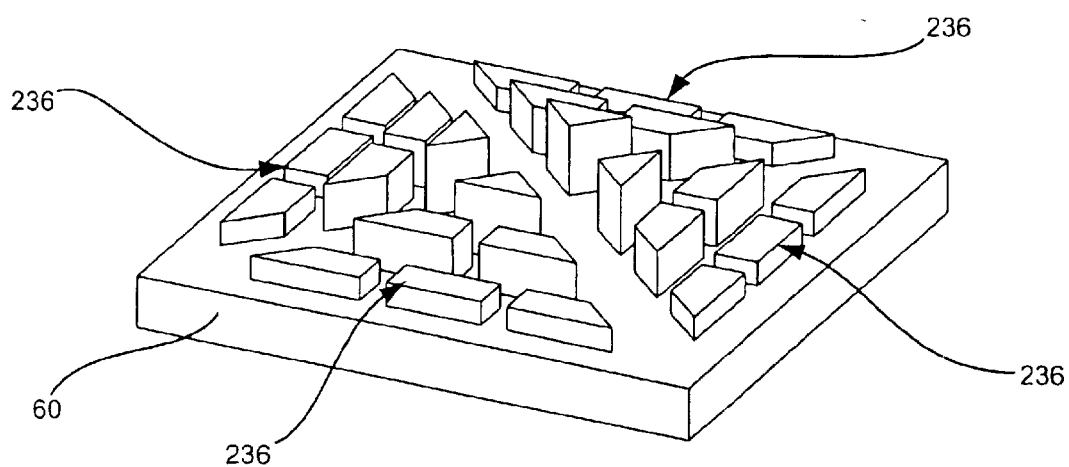

One other type of variant has to do with multiple electrodes replacing any of the electrodes shown in FIGS. 3, 12, and 13. Some of these possible designs are shown in FIGS. 14A–14C. FIG. 14A shows substantially the same element as is seen in FIG. 3B, but with the hinge substructure removed so that only the substrate 60 and the electrodes 232 are shown. In this case, each of the electrodes 76 (e.g., from the embodiment of FIG. 3B) has been replaced by an electrode array 232. Although various types of electrodes have been proposed with different shapes and height configurations, the electrode array 232 is different than previously mentioned ones because each element of the array 232 can be addressed independently.

FIG. 14B shows a different type of electrode array 234 used in place of single electrodes 76. Here, not only the shape of each subelectrode is varied, but also the height, to vary the field strength of each element in the array 234. FIG. 14C displays yet another potential variation, where electrode arrays 236 are broken up further in two dimensions. Single element electrodes 76 require fine control of voltage to enable analog movement of the mirror for continuous positioning. Using a multi-element electrode, control circuitry for each mirror element 46 may be considerably less complex. Potentially, with sufficient numbers of addressable electrodes underneath a mirror, near analog control of a mirror may be possible using digital addressing.

Other configurations of electrodes and overall mirror and related hinge connection configurations are within the scope of the present invention. In the embodiments of the invention shown and such others as may be envisioned, it can be appreciated that variation may also be presented, for example, with respect to the vertical spacing of elements.

Notably, the height or relative spacing of selected items may impact the size and/or orientation of components such as the electrode regions. That is, electrode shape and height may require customization to avoid interference in meeting desired deflection ranges of the micromirror. In any case, these parameters may be tuned as desired.

In addition, it is noted that features described herein in connection with MEMS processing may be applied on a relatively large scale. That is to say, as used herein the term "micromirror" may be applicable to mirror structures upwards of 1 mm in diameter, height and/or length. Such larger structures may find applications outside the fields mentioned here. In all, it is to be appreciated that devices made according to the present invention may be employed not only in the context discussed referring to optical switching arrangements, but further applications involving adaptive optics may apply.

The breadth of the present invention is to be limited only by the literal or equitable scope of the following claims. Efforts have been made to express known equivalent structures and/or features as may be applicable. That any such item or items may not be expressed herein is not intended to exclude coverage of the same in any way. Accordingly,

I claim:

1. A micromirror device comprising:
    a substrate with electrical components including address circuitry;
    a micromirror; and
    a unitary support structure interconnecting said substrate and said micromirror, said support structure including a first torsion member mounted at two locations on said substrate and a second torsion member mounted to opposite ends of said micromirror, said torsion members configured to permit rotation of said micromirror about multiple axes of rotation,
    wherein said electrical components further comprise electrodes adapted to apply attractive forces to said micromirror; and
    wherein at least one of said electrodes is configured with a plurality of portions at different levels, so that portions further from a center of rotation of said micromirror are at a greater distance from the micromirror than portions closer to the center of rotation.

2. The device of claim 1 wherein each of said electrodes comprises a stepped configuration.

3. A micromirror device comprising:
    a substrate with electrical components including address circuitry;
    micromirror; and
    a unitary support structure interconnecting said substrate and said micromirror, said support structure including a first torsion member mounted at two locations on said substrate and a second torsion member mounted to opposite ends of said micromirror, said torsion members configured to permit rotation of said micromirror about multiple axes of rotation;
    wherein said electrical components further comprise electrodes adapted to apply attractive forces to said micromirror, and
    wherein said electrodes are oriented so that portions of said electrodes which are further from a center of rotation of said micromirror are at a greater distance from said micromirror than portions closer to the center of rotation.

4. The device of claim 3, wherein said electrode portions of each said electrode are continuous with one another.

5. The device of claim 3, wherein said portions are discrete members.

6. The device of claim 3 wherein each said electrode comprises a continuous angled member.

7. A micromirror device comprising:
    a substrate with electrical components including address circuitry;
    a micromirror, and a unitary support structure interconnecting said substrate and said micromirror, said support structure including a first torsion member mounted at two locations on said substrate and a second torsion member mounted to opposite ends of said micromirror, said torsion members configured to permit rotation of said micromirror about multiple axes of rotation;

wherein said electrical components further comprise electrodes adapted to apply attractive forces to said micromirror; and wherein each said electrode comprises a substantially planar electrode, wherein said electrodes are oriented so that portions of said electrodes which are further from a center of rotation of said micromirror are at substantially the same distance from said micromirror as portions closer to the center of rotation, when said micromirror is in a neutral configuration.

8. The device of claim 7, wherein said electrodes are mounted on via columns close to said micromirror.

9. The device of claim 7, wherein said portions of each said electrode form an electrode array, and wherein at least one of said portions of at least one of said electrodes is addressable independently of the other of said portions.

10. The device of claim 9, wherein each said portion is independently addressable.

11. The device of claim 7, wherein said portions of each said electrode form an electrode array, and wherein at least one of said portions of at least one of said electrodes is addressable independently of the other of said portions.

12. The device of claim 11, wherein each said portion is independently addressable.

13. A micromirror device comprising:

a substrate with electrical components including address circuitry, a micromirror; and a support structure underlying said micromirror and joining said substrate with said micromirror, said support structure including a first torsion component having first and second ends mounted to said substrate and a second torsion component having first and second ends mounted to opposite ends of said micromirror, said first and second torsion components intersecting one another to provide a universal joint configured to permit rotation of said micromirror about multiple axes of rotation;

wherein said electrical components further comprise electrodes adapted to apply attractive forces to said micromirror, said electrodes being oriented beneath gap locations defined by said torsion components, and wherein said electrodes are oriented so that portions of said electrodes which are further from a center of rotation of said micromirror are at a greater distance from said micromirror than portions closer to the center of rotation.

14. The device of claim 13, wherein each of said electrodes comprises a stepped configuration.

15. The device of claim 13, wherein said electrode portions of each said electrode are continuous with one another.

16. The device of claim 14, wherein said portions are discrete members.

17. The device of claim 13, wherein each said electrode comprises a continuous angled member.

18. The device of claim 13, wherein said portions of each said electrode form an electrode array, and wherein at least one of said portions of at least one of said electrodes is addressable independently of the other of said portions.

19. The device of claim 18, wherein each said portion is independently addressable.

* * * * *